United States Patent
Moffatt

(10) Patent No.: US 11,569,690 B2
(45) Date of Patent: Jan. 31, 2023

(54) SERIES DISTRIBUTED RADIO FREQUENCY (RF) GENERATOR FOR USE IN WIRELESS POWER TRANSFER

(71) Applicant: Etherdyne Technologies, Inc., Palo Alto, CA (US)

(72) Inventor: Robert A. Moffatt, Palo Alto, CA (US)

(73) Assignee: Etherdyne Technologies, Inc., Palo Alto, CA (US)

( * ) Notice: Subject to any disclaimer, the term of this patent is extended or adjusted under 35 U.S.C. 154(b) by 1 day.

(21) Appl. No.: 17/424,952

(22) PCT Filed: Jan. 24, 2020

(86) PCT No.: PCT/US2020/014888
§ 371 (c)(1),
(2) Date: Jul. 22, 2021

(87) PCT Pub. No.: WO2020/154563
PCT Pub. Date: Jul. 30, 2020

(65) Prior Publication Data
US 2022/0094205 A1     Mar. 24, 2022

Related U.S. Application Data

(60) Provisional application No. 62/796,358, filed on Jan. 24, 2019.

(51) Int. Cl.
*H02J 50/12* (2016.01)
*H02J 50/20* (2016.01)
(Continued)

(52) U.S. Cl.
CPC .............. *H02J 50/12* (2016.02); *H01F 38/14* (2013.01); *H02J 50/20* (2016.02); *H02J 50/40* (2016.02)

(58) Field of Classification Search
CPC ............. H02J 50/12; H02J 50/20; H02J 50/40
See application file for complete search history.

(56) References Cited

U.S. PATENT DOCUMENTS

| | | | |
|---|---|---|---|
| 10,892,649 B2 | 1/2021 | Moffatt | |
| 10,931,149 B2 * | 2/2021 | Moffatt | H02J 7/025 |

(Continued)

OTHER PUBLICATIONS

International Search Report and Written Opinion for International Application No. PCT/US2020/14888 dated Apr. 23, 2020.

*Primary Examiner* — Daniel Cavallari
*Assistant Examiner* — Joseph N Inge
(74) *Attorney, Agent, or Firm* — Perilla Knox & Hildebrandt LLP; Kenneth A. Knox

(57) ABSTRACT

A distributed radio frequency (RF) generator for wireless power transfer for wireless power transfer is described. A distributed RF generator can include an electrically-conductive loop having at least a first end and a second end that are adapted to be electrically coupled to one or more direct current (DC) power sources, where the loop comprises a plurality of segments, each of the plurality of segments comprising: a length of wire and at least one active component, wherein the at least one active component has a first terminal and a second terminal that are electrically coupled to the loop, wherein: a DC voltage exists between the first terminal and the second terminal; a DC current flows into the first terminal and out of the second terminal; an oscillating RF voltage is output across the first terminal and the second terminal; and the at least one active component is synchronized in phase.

20 Claims, 16 Drawing Sheets

(51) Int. Cl.
*H02J 50/40* (2016.01)
*H01F 38/14* (2006.01)

(56) References Cited

U.S. PATENT DOCUMENTS

| | | | | |
|---|---|---|---|---|
| 10,957,480 | B2* | 3/2021 | Moffatt | H02J 50/70 |
| 11,128,172 | B2* | 9/2021 | Ettes | H02J 50/80 |
| 2012/0193997 | A1* | 8/2012 | Hong | H01Q 7/005 |
| | | | | 307/104 |
| 2014/0055090 | A1* | 2/2014 | Krause | B60L 53/305 |
| | | | | 320/108 |
| 2016/0254702 | A1* | 9/2016 | Akuzawa | H02M 7/48 |
| | | | | 307/104 |
| 2018/0109144 | A1* | 4/2018 | Moffatt | H04B 5/0037 |
| 2018/0331582 | A1* | 11/2018 | Moffatt | H02J 50/20 |
| 2020/0212718 | A1* | 7/2020 | Moffatt | H02J 50/402 |
| 2021/0175748 | A1* | 6/2021 | Moffatt | H02M 3/33576 |
| 2021/0384763 | A1* | 12/2021 | Moffatt | H02J 50/12 |

* cited by examiner

SERIES DISTRIBUTED RADIO FREQUENCY (RF) GENERATOR FOR USE IN WIRELESS POWER TRANSFER

CROSS-REFERENCE TO RELATED APPLICATION

This application is a national phase application under 35 U.S.C. § 371 of International Application No. PCT/US2020/014888 entitled "SERIES DISTRIBUTED RADIO FREQUENCY (RF) GENERATOR FOR USE IN WIRELESS POWER TRANSFER," filed Jan. 24, 2020, which claims the benefit of and priority to U.S. Provisional Patent Application No. 62/796,358 entitled "SERIES DISTRIBUTED RADIO FREQUENCY (RF) GENERATOR FOR USE IN WIRELESS POWER TRANSFER," filed Jan. 24, 2019, the contents of both of which being incorporated by reference in their entirety herein.

BACKGROUND

Wireless power transfer is the transmission of electrical energy from a power source to an electrical load without the use of man-made conductors to connect the power source to the electrical load. A wireless power transfer system consists of a transmitter and one or more receiver devices. The transmitter is connected to a source of power and converts the power to a time-varying electromagnetic field. The one or more receiver devices receive the power via the electromagnetic field and convert the received power back to an electric current to be utilized by the electrical load.

The recent proliferation of small sensors and the Internet-of-Things (IoT) has introduced a new need for powering a large number of small devices within a large, pre-defined area, such as a room, factory, grain silo, etc. Because wires limit device mobility, and batteries place strict limitations on device functionality and lifetime, a wireless power solution is desirable.

BRIEF SUMMARY OF THE INVENTION

In general, a distributed radio frequency (RF) generator for wireless power transfer, and a system and a method thereof, are described for wireless power transfer. A distributed RF generator can include an electrically-conductive loop having at least a first end and a second end that are adapted to be electrically coupled to one or more direct current (DC) power sources, where the loop comprises a plurality of segments, each of the plurality of segments comprising: a length of wire and at least one active component, wherein the at least one active component has a first terminal and a second terminal that are electrically coupled to the loop, wherein: a DC voltage exists between the first terminal and the second terminal; a DC current flows into the first terminal and out of the second terminal; an oscillating RF voltage is output across the first terminal and the second terminal; and the at least one active component is synchronized in phase.

The distributed RF generator further includes at least one passive sub-segment comprising a length of wire and at least one passive component, the at least one passive component comprising at least one capacitor; and at least one active sub-segment, the at least one active sub-segment comprising a length of wire and the at least one active component. The at least one passive component can include the at least one capacitor and at least one RF choke connected in parallel with the at least one capacitor. The at least one capacitor can be preselected such that the loop is series resonant at a pre-determined frequency. The at least one RF choke can include an inductor and can be preselected to have a high impedance at the pre-determined frequency so as not to significantly affect the resonance of the loop.

Each active component can include a zero voltage switching (ZVS) configuration. Each ZVS configuration can include control circuitry that automatically performs ZVS based on a sensed condition within the respective active component; and the sensed condition within the respective active component comprises a sensed RF current. A phase synchronization of the at least one active component can be performed automatically in that all of the active component are phase synchronized to the same RF current flowing in the loop, and each ZVS configuration comprises a plurality of transistors configured as an electrically-controllable switch that operates as ZVS amplifier. Each ZVS amplifier can be a Class E amplifier.

The DC power source can be one of a plurality of direct current (DC) power sources; and the first end and the second end of the electrically-conductive loop are adapted to be electrically coupled to the plurality of DC power sources.

DETAILED DESCRIPTION

Figure 1:
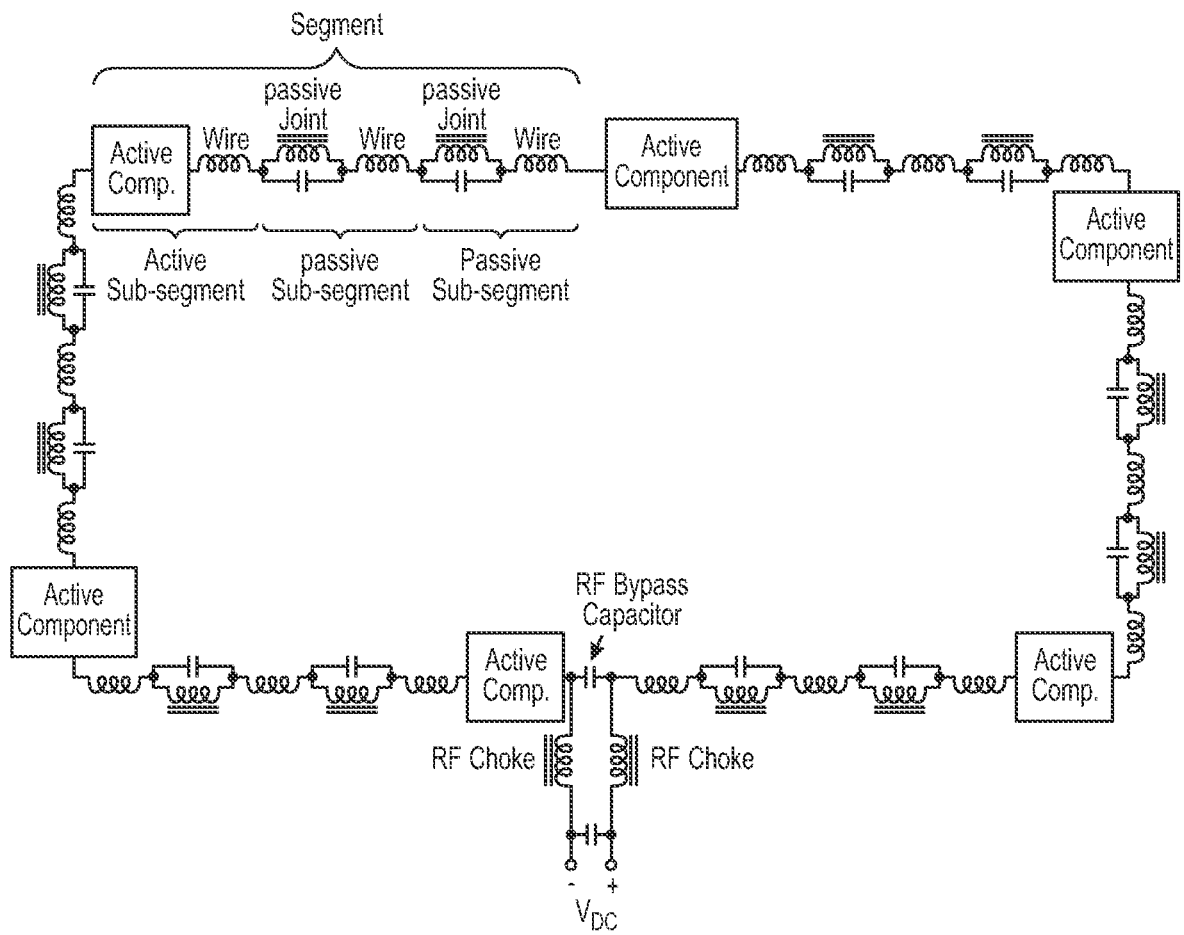
FIG. 1 shows a series distributed RF generator having a number of linear segments, joined in series, to form a loop, in accordance with an embodiment.

The present disclosure relates to a series distributed radio frequency (RF) generator for use in wireless power transfer. In some embodiments, wireless power is delivered through a resonant near-field magnetic loop antenna, which fills an entire volume of interest with an oscillating magnetic field. In order to simplify installation, it is desirable for the system to be relatively insensitive to both the exact shape and size of the loop antenna, while also maintaining consistent operation under varying load conditions. Accordingly, various embodiments are described for a distributed RF generator design, which can drive a resonant nearfield magnetic loop antenna while simultaneously satisfying these conditions.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method of using a distributed RF generator for wireless power transfer, and a system for wireless power transfer. FIG. 1 shows a series distributed RF generator 1 in accordance with a representative embodiment. The distributed RF generator 1 includes a number of linear segments, joined in series to form a loop. The two ends of the loop are joined by an RF bypass capacitor. The RF bypass capacitor is connected across a DC power supply, $V_{DC}$, through two RF chokes, which block RF current and voltage from passing to the DC power supply.

Note that it is also possible to provide DC power to the loop from more than one DC power supply. In such a case, the loop can have two or more RF bypass capacitors connected in series with the loop. Each RF bypass capacitor can be connected across a DC power supply through RF chokes, which block RF current and voltage from passing to the DC power supplies. The DC supplies are connected to the loop so that their DC voltages add.

In various embodiments, each segment of the loop comprises one active sub-segment and a number of passive sub-segments. Each sub-segment includes a length of wire having some inductance per unit length, l. The inductance of each of these lengths of wire is depicted in FIG. 1 by a lumped-element inductor symbol. Each passive sub-segment is connected to the preceding sub-segment by a passive joint. In accordance with a representative embodiment, each passive joint comprises a capacitor in parallel with an RF choke. The capacitors in all of the passive joints are chosen so that the entire loop is series-resonant at a pre-determined frequency. The RF chokes in all of the passive joints can be selected to have a high impedance at the pre-determined frequency so as to not significantly affect the resonance of the loop, while still allowing DC current to flow around the loop.

There are two notable frequencies of the distributed RF generator, namely, the aforementioned pre-determined frequency and the drive frequency. The pre-determined frequency is the self-resonant frequency of the loop defined as its effective series LRC resonance frequency when all of the active components are shorted. The drive frequency is set by the internal oscillator or narrow band-pass filter inside of each active component, as will be described below in more detail. These two frequencies are not equal to each other. However, they are related to each other by the ZVS requirement in embodiments in which a ZVS configuration is included.

The drive frequency may be chosen such that the drive frequency determines a range of self-resonant frequencies for which ZVS is possible. The actual self-resonant frequency will depend on detuning from objects in the environment surrounding the loop, and from the load condition. The capacitors in the passive joints can be chosen so that the typical self-resonant frequency of the loop will be close to the middle of the range of self-resonant frequencies which the automatic ZVS (AZVS) configuration can accommodate, as will be described below in more detail.

In accordance with a representative embodiment, each active sub-segment may include a length of wire and an active component. In accordance with a representative embodiment, the active component is an RF generator having first and second terminals. The first and second terminals are used simultaneously as an input for DC power and as an output for RF power, respectively. The DC power supply, $V_{DC}$, applies a constant DC voltage between the two ends of the loop which are joined by the RF bypass capacitor. This DC voltage is distributed approximately equally across all of the active components in the loop.

The DC power supply also supplies a constant DC current which circulates around the loop. This DC current flows through the two terminals of each of the active components. The product of the DC voltage and the DC current of each active component is equal to the DC power supplied to that component. Each active component absorbs DC power and converts it into RF power. This RF power is output by means of an oscillating RF voltage which is generated across the two terminals of each active component and linearly superimposed upon the DC voltage which appears across the same two terminals.

The oscillating RF voltages generated by all of the active components add in series. The RF voltages are synchronized so that they add constructively. The total series RF voltage generated by all of the active components drives an RF current which circulates around the loop, and the phase synchronization of the active components is achieved by phase-locking each active component to the phase of this common RF current which is shared by all of the active components on account of their series connection.

In general, the RF current circulating around the loop can be used to perform useful work by delivering RF power to any number of RF loads, which may be placed in series with the loop, or may be inductively or radiatively coupled to the loop. In some instances, the active components may be Class E amplifiers with automatic zero-voltage switching (ZVS), as will be described below in more detail.

In some cases, it may be desirable to suppress the conduction of signals at harmonic multiples of the drive frequency of the distributed RF generator. In such cases, it may be necessary or desirable to place RF filters in series with the loop which pass signals at DC and the drive frequency, but which block signals at one or more harmonics of the drive frequency. Such filters may comprise low-pass filters, tuned resonant filters, etc. If such filters are present, the series resonant frequency of the loop should be tuned while including the reactive effects of these filters at the drive frequency of the distributed RF generator.

Now, the need for a distributed amplifier is briefly described. Consider the case of a wireless power system consisting of a single loop with distributed capacitance shaped in a circular, rectangular, or zig-zag pattern. The loop is driven with a pre-determined RF current amplitude at a pre-determined RF frequency, and is tuned to behave as a series LRC circuit which is resonant at the pre-determined frequency.

If the loop were driven at one point by a single RF amplifier, problems arise when the loop becomes large. Regardless of the shape of the loop, its resistance per unit length and its inductance per unit length either grow or approach constant values as the size of the loop grows without bound. If the loop were driven by a single RF amplifier at a single drive point, this implies that the input impedance of the loop at the drive point grows continually larger as the size of the loop grows and its total length of wire increases.

This means that it will become progressively more difficult to achieve a proper impedance match between the loop and the RF amplifier as the size of the loop is increased. Additionally, the high impedance at the drive point means that a high RF voltage and high electric field will be present at that point and in its vicinity. This electric field has the potential to cause losses in nearby dielectrics. A high electric field also causes safety concerns due to the possibility of inducing high voltages on nearby conductors through capacitive coupling, and also due to absorption of RF power in human tissue via stray electric fields.

These problems may be solved by driving the loop from multiple points, as depicted in FIG. 1. The system shown in FIG. 1 has the additional advantages that all of the RF amplifiers in the loop derive their power from the loop, and that they lock their phase using the common RF current. In other words, no additional wiring is needed to drive the amplifiers other than the wire of the loop itself.

Figure 2:
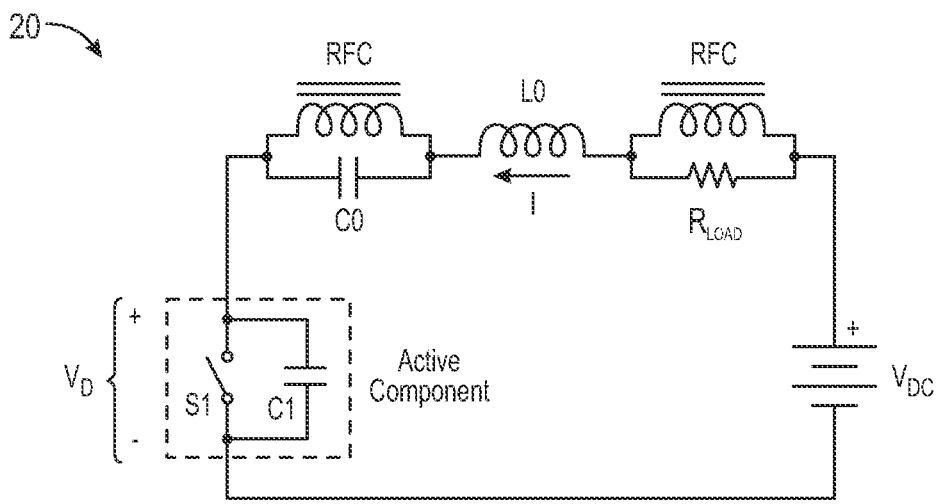
FIG. 2 is a simplified schematic diagram of the RF generator shown in FIG. 1 with a single active component having a Class-E amplifier that performs Zero Voltage Switching (ZVS).

Next, the principals of operation of a Class-E ZVS amplifier are described. FIG. 2 is a simplified schematic diagram of the RF generator shown in FIG. 1 with a single active component having a Class-E amplifier that performs Zero Voltage Switching (ZVS) in accordance with a representative embodiment. Power is provided to the amplifier from the DC power supply, $V_{DC}$. The current, I, flowing around the loop has both a DC and an RF component. The RF Chokes, labeled RFC, block the RF component of the current, I, but pass the DC component with negligible resistance.

The active component includes an electrically-controllable switch, $S_1$, in parallel with a capacitor, $C_1$, along with control circuitry for switching $S_1$ on and off (not shown). When the amplifier 20 is in a steady state, the switch $S_1$ is switched on and off with a constant period, T, and duty cycle, δ. When $S_1$ is on, the current, I flows through $S_1$ and the voltage, $V_D$, across the active component is zero. When $S_1$ is off, the current, I, flows into capacitor $C_1$, causing it to charge. If the DC component of the current is sufficiently small, the voltage, $V_D$, across capacitor $C_1$, will be approximately sinusoidal, and will return to zero after a time period shorter than the switching period, T.

To maximize efficiency, it is optimal to run the amplifier in a mode called Zero Voltage Switching (ZVS). In this mode, the timing of the switch, $S_1$, is chosen such that it is switched on at the same moment when the voltage of capacitor, $C_1$, reaches zero. This ensures that the capacitor, $C_1$, does not have any stored electrical energy when the switch, $S_1$, is turned on. If the ZVS condition is not met, then any electrical energy stored in capacitor, $C_1$, will be dissipated as heat in the resistance of switch, $S_1$, at the instant when the switch, $S_1$, is turned on.

Assuming that the ZVS condition is met, and that the switch, $S_1$, is close to ideal, then the switch, $S_1$, will dissipate negligible power. The switch, $S_1$, has a positive DC voltage across it, equal to the average of the voltage, $V_D$, over one period. The active component must therefore absorb a DC power equal to the product of this DC voltage and the DC component of the current, I.

Because the active component dissipates negligible power in the ZVS condition, nearly all of the DC power absorbed by the active component is converted into RF power. This RF power is delivered to the RF load, $R_{LOAD}$, and maintains the RF current circulating around the loop.

Figure 3:
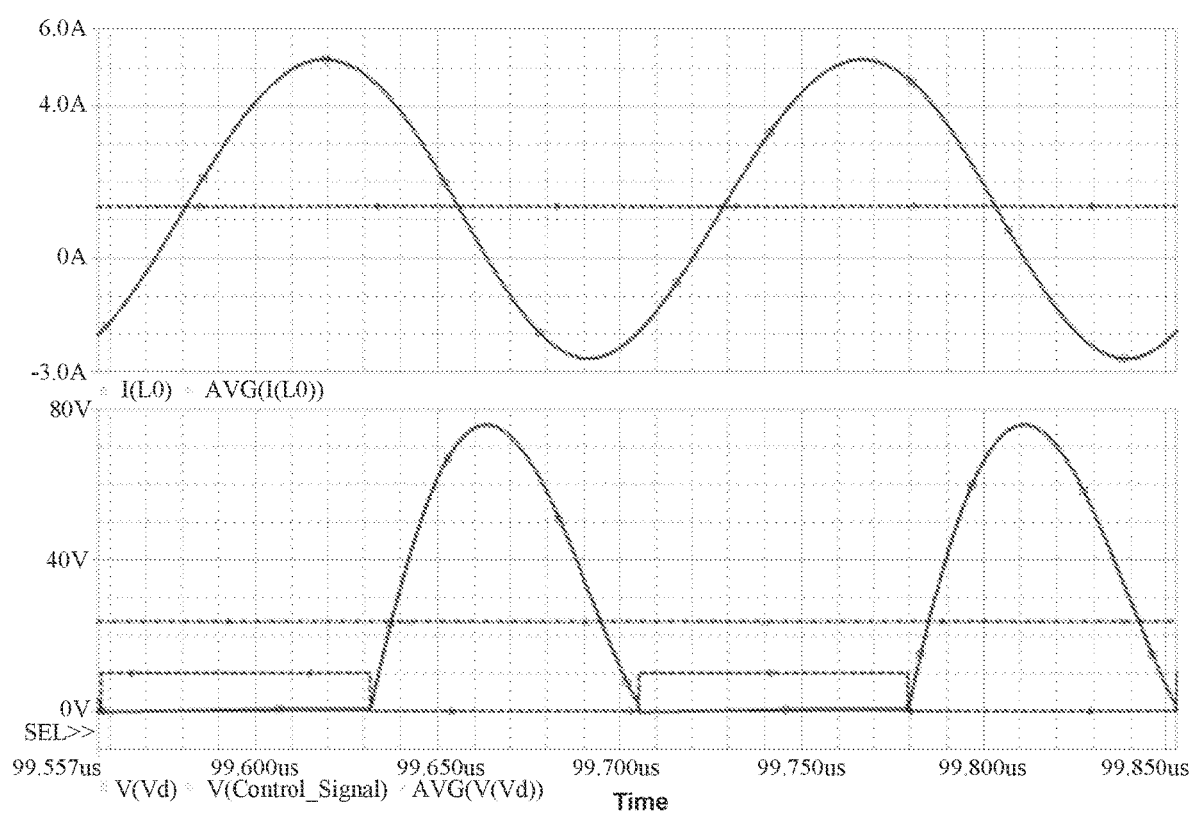
FIG. 3 are graphs showing simulated voltage and current waveforms for the active component having the Class-E ZVS amplifier shown in FIGS. 2 and 4.
Figure 4:
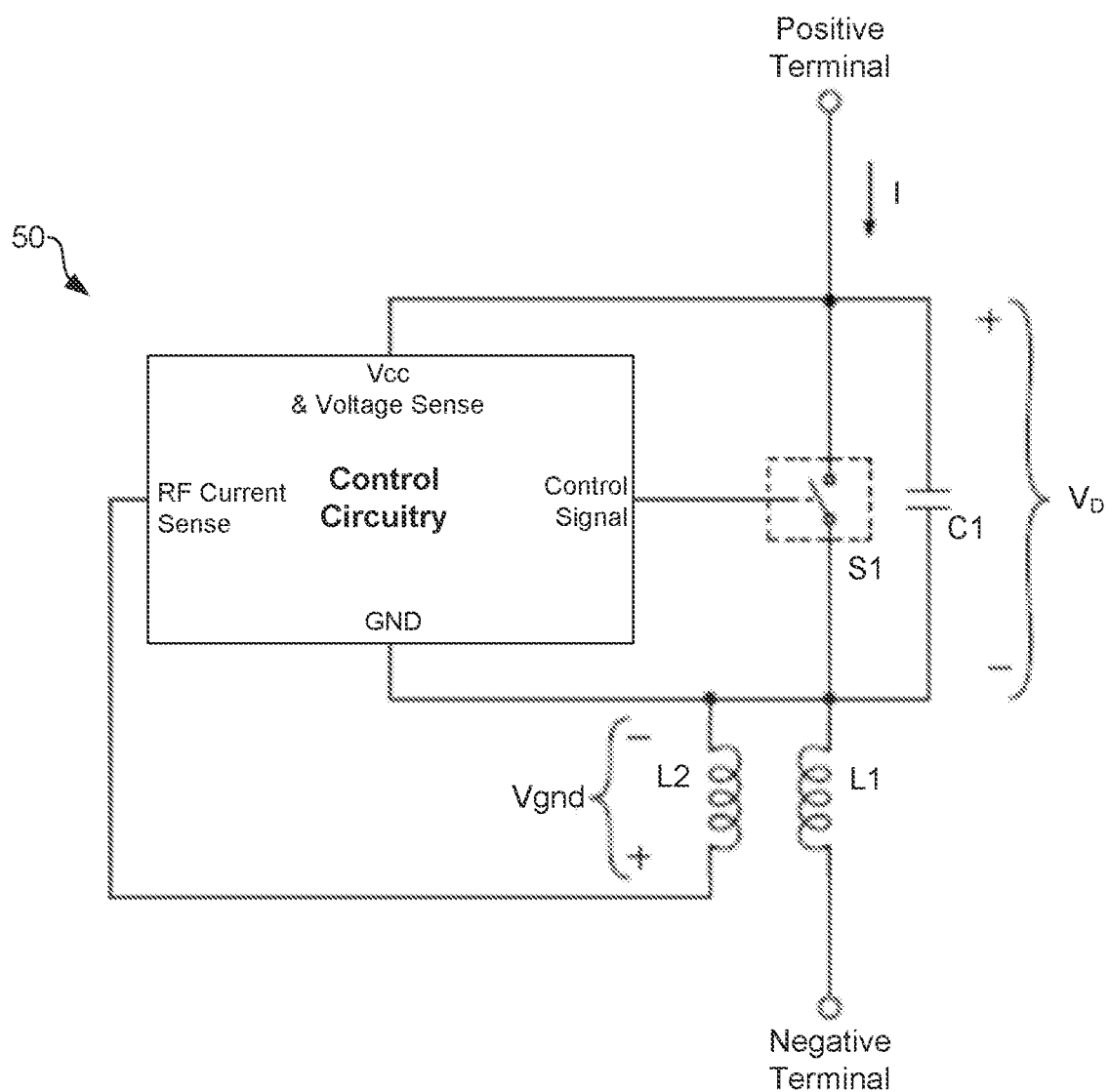
FIG. 4 is a simplified block diagram of the active component having a Class-E ZVS amplifier in which a control signal drives an electrically-controllable switch, $S_1$, of the amplifier in accordance with an embodiment.

FIG. 3 is a graph showing simulated voltage and current waveforms for the active component of the Class-E ZVS amplifier shown in FIGS. 2 and 4. The top plot shows the RF component of the current waveform (solid line) and the DC component of the current waveform (dashed line) flowing through the inductor, L0, of FIG. 2, or into the positive terminal and out of the negative terminal of the active component depicted in FIG. 4. The bottom plot shows the voltage waveform across switch S1 (solid line), and its average value over one cycle (dot-dash line). The average value of the voltage waveform is equal to the DC voltage across the two terminals of the active component. Also depicted in the bottom plot of FIG. 3 is the control signal waveform for the electrically-controllable switch, S1. This control waveform is a binary logic control signal. When the control signal is logic high, S1 is on. When the control signal is logic low, S1 is off. The switch S1 is turned on at the instant in time when the control signal undergoes an low-to-high transition. Note that this transition is synchronous with the zero-crossing of the voltage waveform of the active component, which means that this Class-E amplifier is operating in Zero Voltage Switching (ZVS) mode.

FIG. 4 shows a simplified block diagram for the active component 40 that includes a Class-E amplifier with AZVS in accordance with a representative embodiment. This active, two terminal, component represents the $S_1$, $C_1$ combination shown in the simplified schematic of FIG. 2, along with the additional circuitry which generates the control signal for the electrically-controllable switch, $S_1$.

The control circuitry may derive its DC power from the positive and negative terminals of the active component. It may use some combination of filtering, rectification, regulation, switching and/or DC-to-DC conversion to generate a constant DC voltage from the time-varying voltage, $V_D$, present across these two terminals. Alternatively, it may use some combination of filtering, rectification, regulation, switching and/or DC-to-DC conversion to generate a constant DC voltage from the RF voltage induced in the secondary inductor, $L_2$, in the transformer formed by the coupled inductors, $L_1$ and $L_2$.

In accordance with an embodiment, the control circuitry generates a square wave with period, T, duty cycle, δ, and phase, φ. The period, T, is set by an internal frequency reference within the control circuitry, such as a quartz crystal or MEMs resonator. The control circuitry varies the duty cycle, δ, based on feedback derived from sensing the voltage waveform, $V_D$. If the voltage waveform, $V_D$, reaches zero before the instant in time when the switch, $S_1$, is turned on, the control circuitry increases the duty cycle, δ, causing the switch, $S_1$, to turn on sooner in the cycle. If the voltage waveform, $V_D$, does not yet reach zero at the instant in time when the switch, $S_1$, turns on, the control circuitry decreases the duty cycle, δ, causing the switch, $S_1$, to turn on later in the cycle. The control circuitry continually monitors the voltage waveform, $V_D$, and adjusts the duty cycle, δ, accordingly in order to maintain the ZVS condition. The timescale of this feedback mechanism is chosen to be much slower than the switching period, T.

By the mechanism described above, the active component is able to automatically maintain the ZVS condition over a wide range of tuning and load conditions of the Class-E amplifier. This allows efficient ZVS operation to be maintained without the need for precise tuning or impedance matching.

Figure 13:
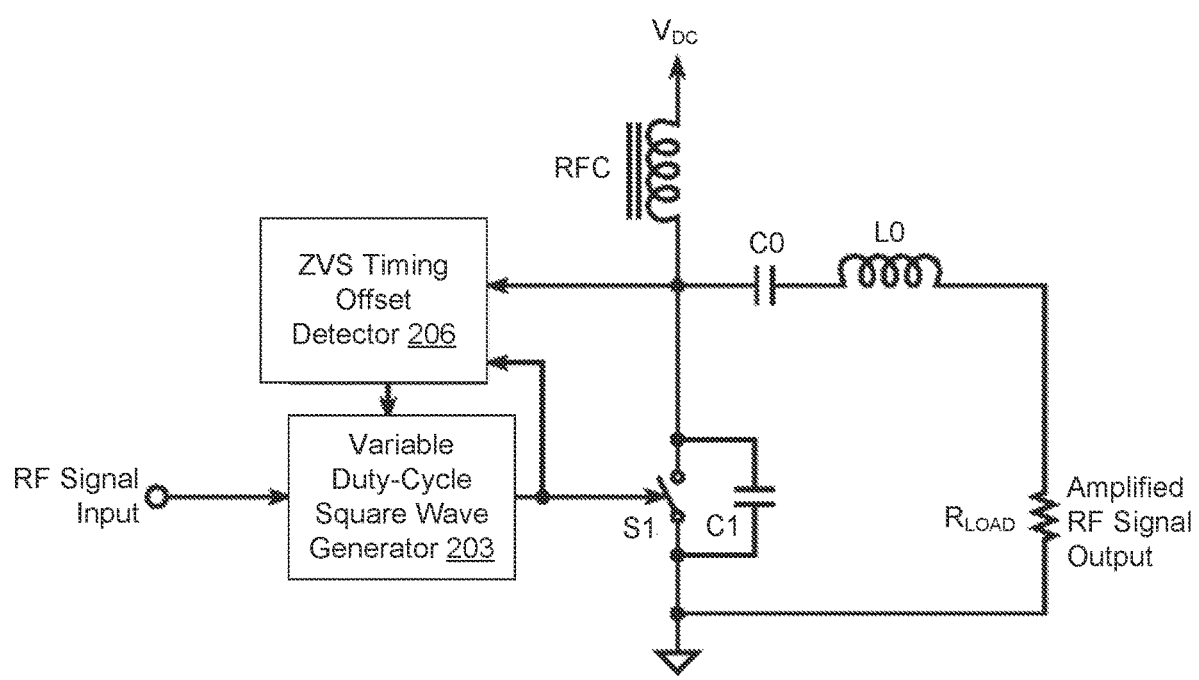
FIG. 13 and FIG. 14 are block diagram for a Class-E amplifier with automatic zero voltage switching (AZVS).

Note that the AZVS mechanism described above may also be applied to an RF amplifier consisting of a single Class-E amplifier, as depicted in FIG. 13. A square wave generator, such as a variable duty-cycle square wave generator 203, can generate a square wave with a frequency and phase determined by the input RF signal. The input signal may be a sine wave, a square wave, or some other waveform. The output of the square wave generator is a square wave with a duty cycle determined by a feedback signal from a ZVS timing offset detector 206.

The square wave generator 203 may also incorporate a duty-cycle dependent phase shift. The switching of S1 converts the DC power from the input DC power terminal, VDC, into an RF power, output to a load, depicted as an effective series resistance, Rload. In practice, a load may be coupled in series with the inductor, L0, in parallel with capacitor, C0, inductively coupled with inductor, L0, or coupled by any other mechanism which transfers RF power from the tank circuit, consisting of L0 and C0, to the RF load. The feedback from the ZVS timing offset detector 206 automatically controls the duty cycle of the drive signal for switch, S1, to ensure that the ZVS condition is satisfied for a wide range of values of the load resistance and tuning of the L0, C0 tank circuit, therefore allowing efficient operation without the need for precise tuning and impedance matching of the output network of the Class-E amplifier.

Next, the series combination of active components is described. In accordance with an embodiment, the active component shown in FIG. 4, which can be used as the active components shown in FIG. 1, derives its power from the same two terminals which it uses to output RF power. If multiple active components are connected in series in a loop, as shown in FIG. 1, a single DC power supply can power all of the active components simultaneously through the loop itself, without the need for additional wiring. The RF power of all of the active components will add, so long as the timing is arranged so that all of the active components are switching in phase.

Figure 5:
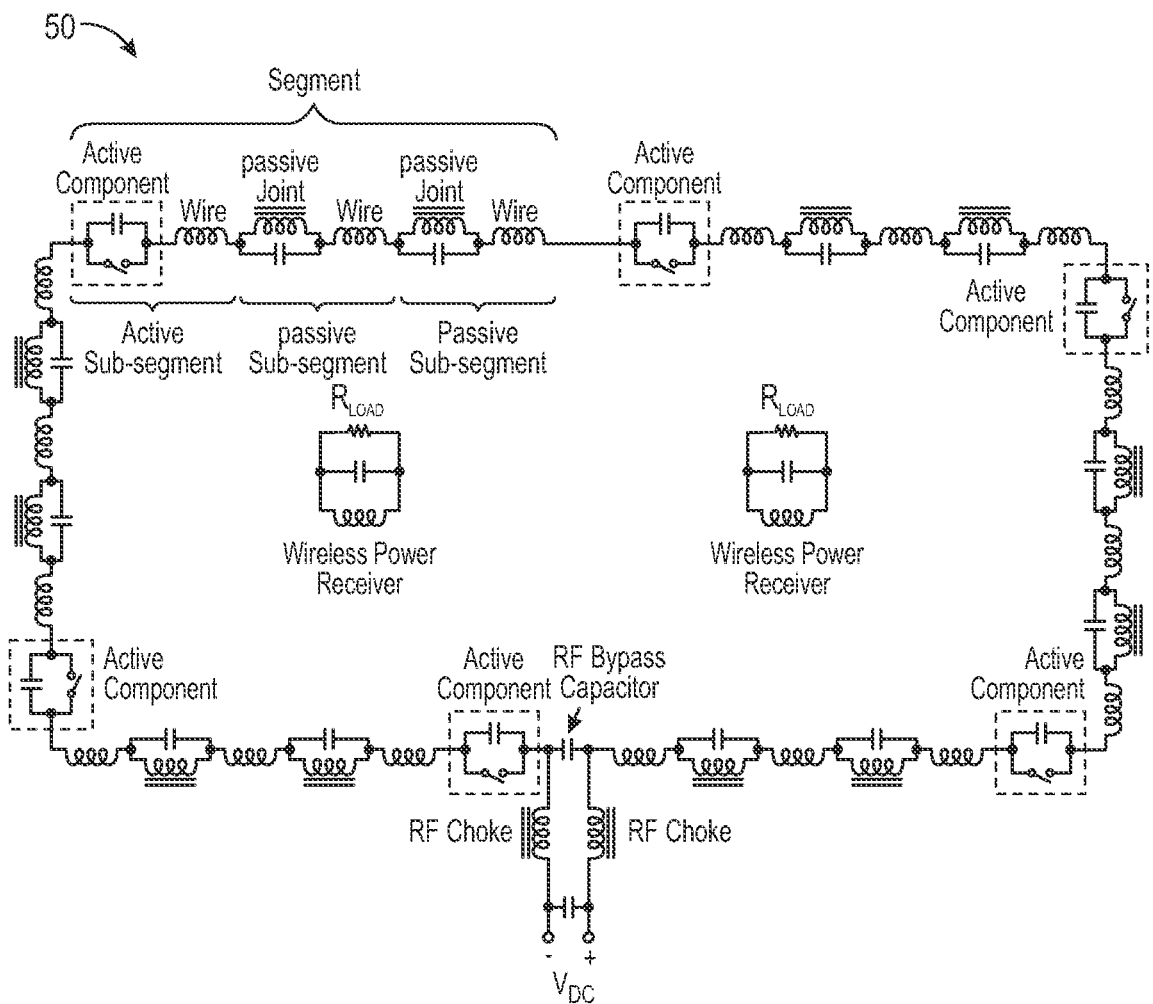
FIG. 5 shows a distributed RF generator having active components that include the Class E amplifier in accordance with an embodiment with wireless power receivers disposed in a wireless power transfer area of the loop of the distributed RF generator.

FIG. 5 shows a distributed RF generator having active components that include the Class E amplifier in accordance with an embodiment with wireless power receivers disposed in a wireless power transfer area of the loop of the distributed RF generator. The phase synchronization of the active components may be established by arranging the active components to lock their phases to a single common source. Because all of the active components are in series, they all share the same RF current. If each active component maintains a constant phase relation with respect to this RF current, then they all maintain a constant phase relation with respect to each other. Therefore, phase synchronization of the active components can be established by locking the phase of each active component to have a constant offset relative to the phase of the RF current flowing through it.

FIG. 4 illustrates one means by which this may be accomplished. The transformer, comprising inductors $L_1$ and $L_2$, picks up an induced RF voltage, $V_{ind}$, which is linearly proportional to the RF current flowing through the active component. This signal is fed to the control circuitry, and is used by the control circuitry to set the frequency and the phase of the square wave which it generates as the control signal. This may be accomplished passively using for example, a narrow band-pass filter, or actively using for example, a phase-locked loop or an injection-locked oscillator.

Figure 6:
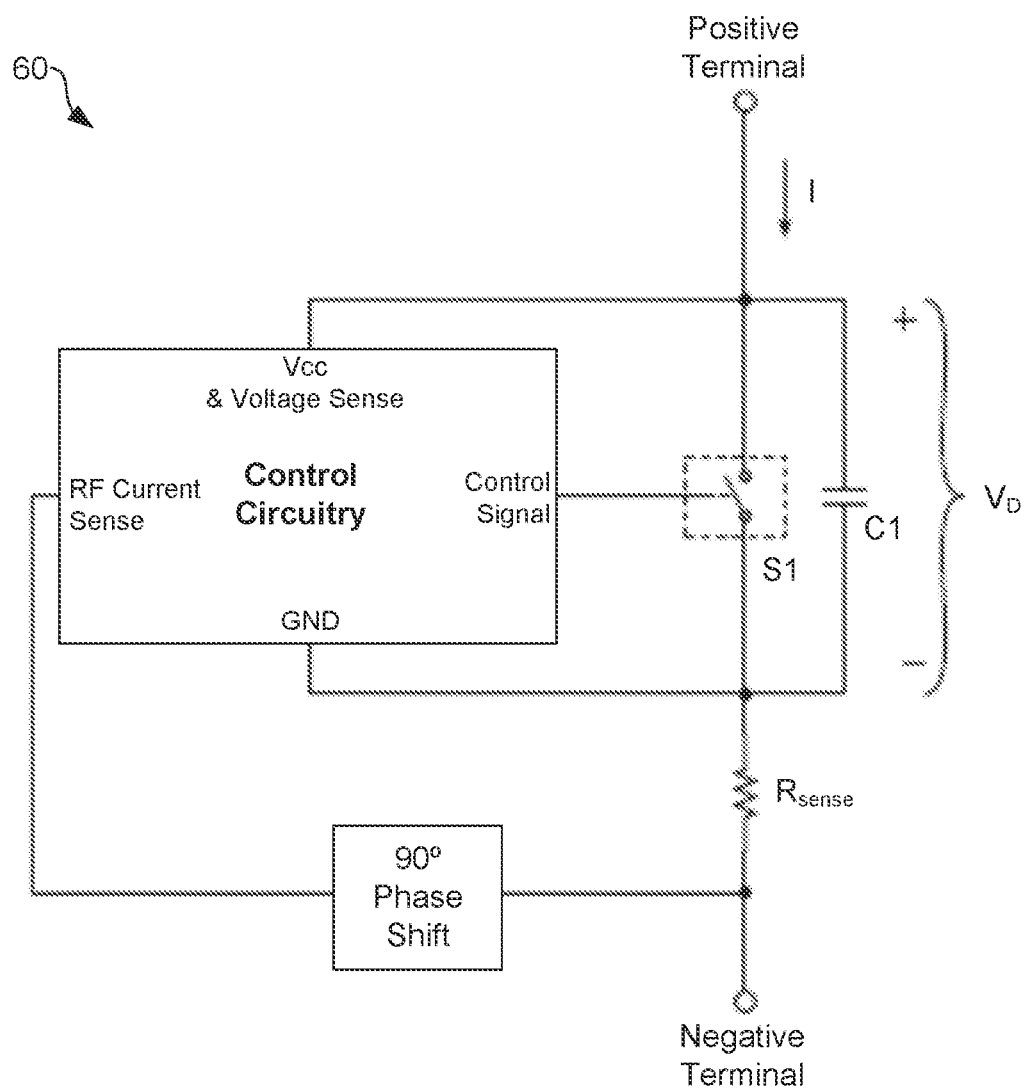
FIG. 6 is a simplified block diagram for the active component that includes a Class-E ZVS amplifier and that uses a resistor, $R_{sense}$, to sense the RF current flowing between the positive and negative terminals of the active component in accordance with an embodiment.

FIG. 6 is a simplified block diagram for the active component that includes a Class-E ZVS amplifier and that uses a resistor, $R_{sense}$, to sense the RF current flowing between the positive and negative terminals of the active component in accordance with an embodiment. FIG. 6 also illustrates an alternative method for locking the phases of the active components relative to each other. Instead of using the transformer shown in FIG. 4 to sense the RF current, the active component depicted in FIG. 6 uses a series resistor, $R_{sense}$, to sense the RF current flowing between the two terminals of the active component. Note that the voltage across the resistor, $R_{sense}$, is shifted in phase by 90° relative to the voltage, $V_{ind}$, induced in inductor $L_2$ in FIG. 4. Therefore, additional circuitry, depicted by the block labeled "90° phase shift" in FIG. 6, is needed to accommodate this 90° phase difference. This additional 90° phase shift may be incorporated into the behavior of the control circuitry itself.

Because all of the active components maintain a constant phase with respect to each other, this phase-lock mechanism will also ensure that they all operate at the same frequency, regardless of any variance in their internal frequency references.

Figure 7:
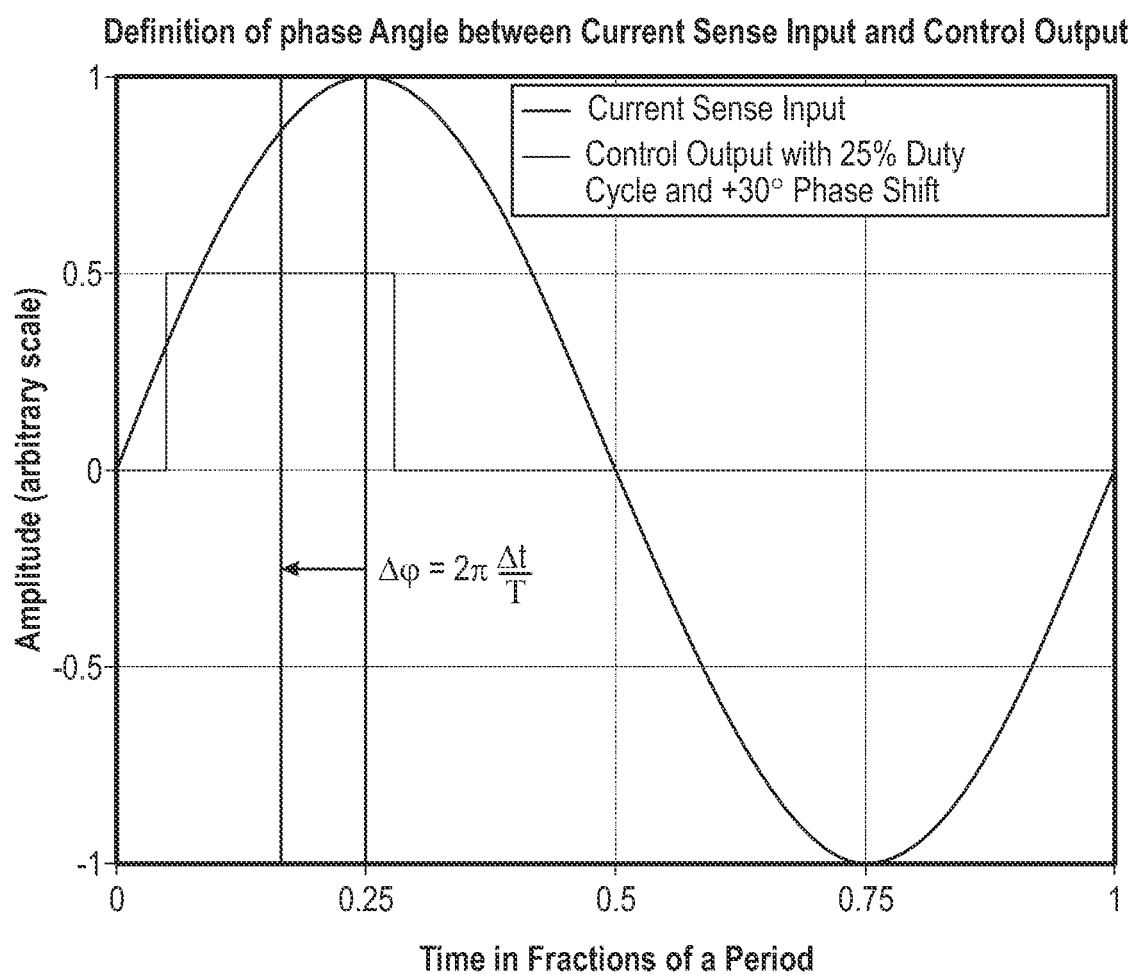
FIG. 7 is a graph that shows an example of a Current Sense Input signal (sine wave) and a Control Signal Output (square wave) in accordance with an embodiment.

Now, the relation between phase and duty cycles is discussed. FIG. 7 shows an example of a Current Sense Input signal (sine wave) and a Control Signal Output (square wave). FIG. 7 also graphically defines the phase angle between the Current Sense Input (sine wave) and the Control Output (square wave). Let the relative phase angle between the two waves be defined as the phase difference between the complex phasors of the fundamental components of their respective Fourier series. This definition of phase angle implies that the sine wave and the square wave are in phase when the center of the square pulse (defined as halfway between the rising and the falling edge) is synchronous with the peak of the sine wave.

Under light load and under typical tuning conditions, the duty cycle of the Control Signal output will be approximately 50% and the phase shift between the Control Signal and the RF Current Sense input will be approximately zero. Under heavy load, or in cases where the resonant loop is detuned, the duty cycle of the Control Signal output will need to differ from 50% in order to achieve ZVS. If the active components are connected in a series chain, each active component will adjust its duty cycle independently in order to achieve the ZVS condition.

If the phase shift between the Current Sense Input and the Control Signal Output of each control circuit is independent of the duty cycle, then the chain of amplifiers develops an instability in which the total series DC voltage around the loop is not equally shared by all of the active components. In order to eliminate this instability, it is necessary for each control circuit to introduce a duty-cycle-dependent phase shift, $\Delta\varphi$, between the Current Sense input and the Control Signal output. One example of a duty-cycle-dependent phase shift which eliminates this instability is given by the following equation:

$$\Delta_{\varphi_i} = \pi k \left( \delta_i - \frac{1}{2} \right), \quad \text{(eq. 1)}$$

where $\Delta_{\varphi_i}$ and $\delta_i$ are the phase shift and the duty cycle of the ith active component, respectively, and the coefficient, k, is a dimensionless number greater than 0.

The system becomes more stable for larger values of k. Note that if k=1, then the falling edge of the Control Signal Output remains synchronous with the negative-slope zero-crossing of the Current Sense Input, regardless of the duty cycle, $\delta_i$.

The electrically-controllable switch, S1, depicted in FIGS. 2, 4 and 6, may be implemented using, for example, a MOSFET, a BJT, or any electrically-controllable switch with a switching speed significantly faster than the predetermined operating frequency of the system.

FIGS. 8-11 depict block diagrams of different representative embodiment of the control circuitry of the active components 40 and 60 shown in FIGS. 4 and 6, respectively. The control circuitries 80 and 90 shown in FIGS. 8 and 9 have AZVS configurations, whereas the control circuitry 100 shown in FIG. 10 does not. These active, two terminal, components represents the $S_1$, $C_1$ combination shown in the simplified schematic of FIG. 2, along with the additional circuitry which generates the control signal for the electrically-controllable switch, $S_1$.

Figure 8:
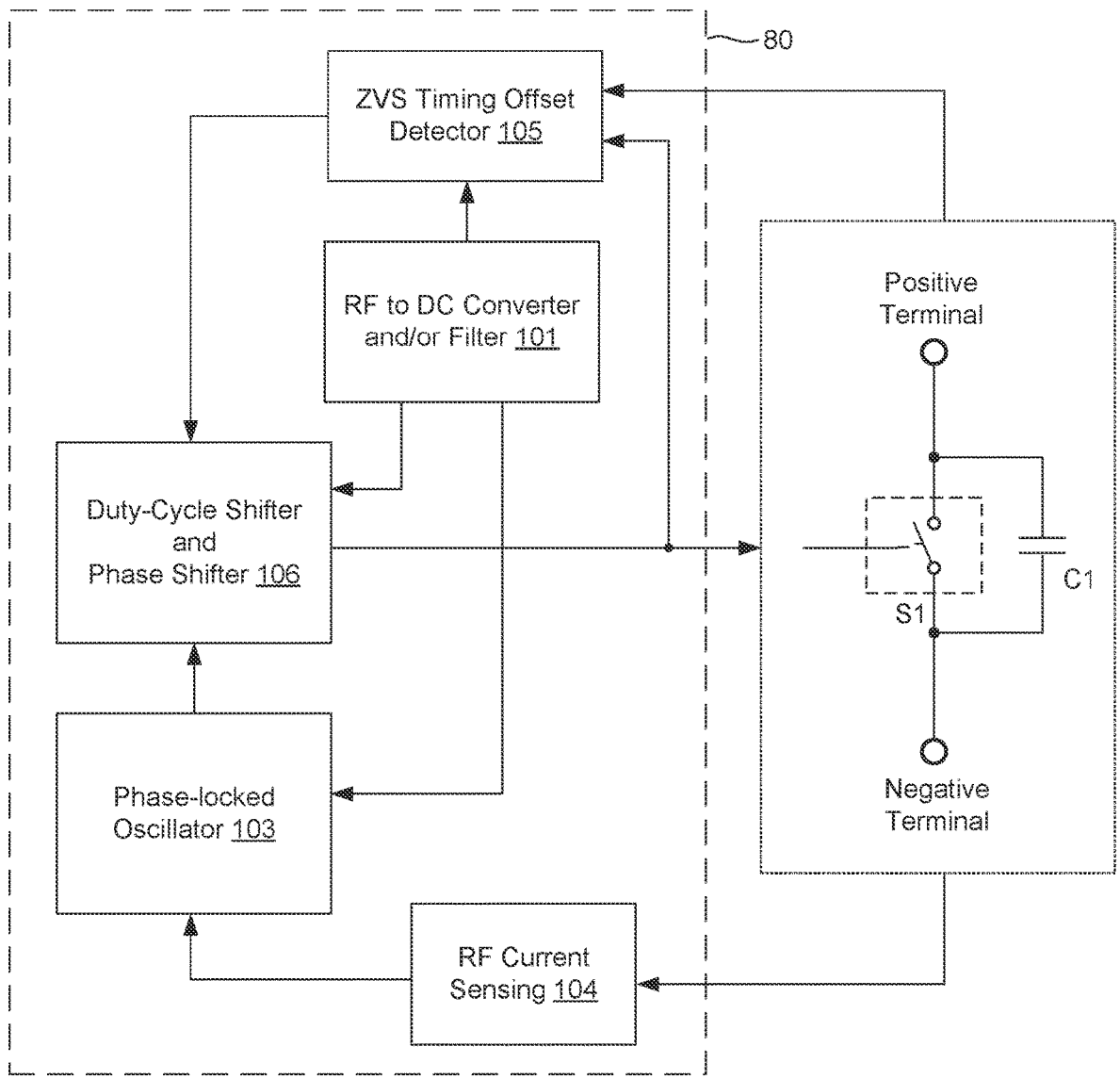
FIGS. 8-11 depict block diagrams of different representative embodiments of the control circuitry of the active components shown in FIGS. 4 and 6, respectively.
Figure 9:
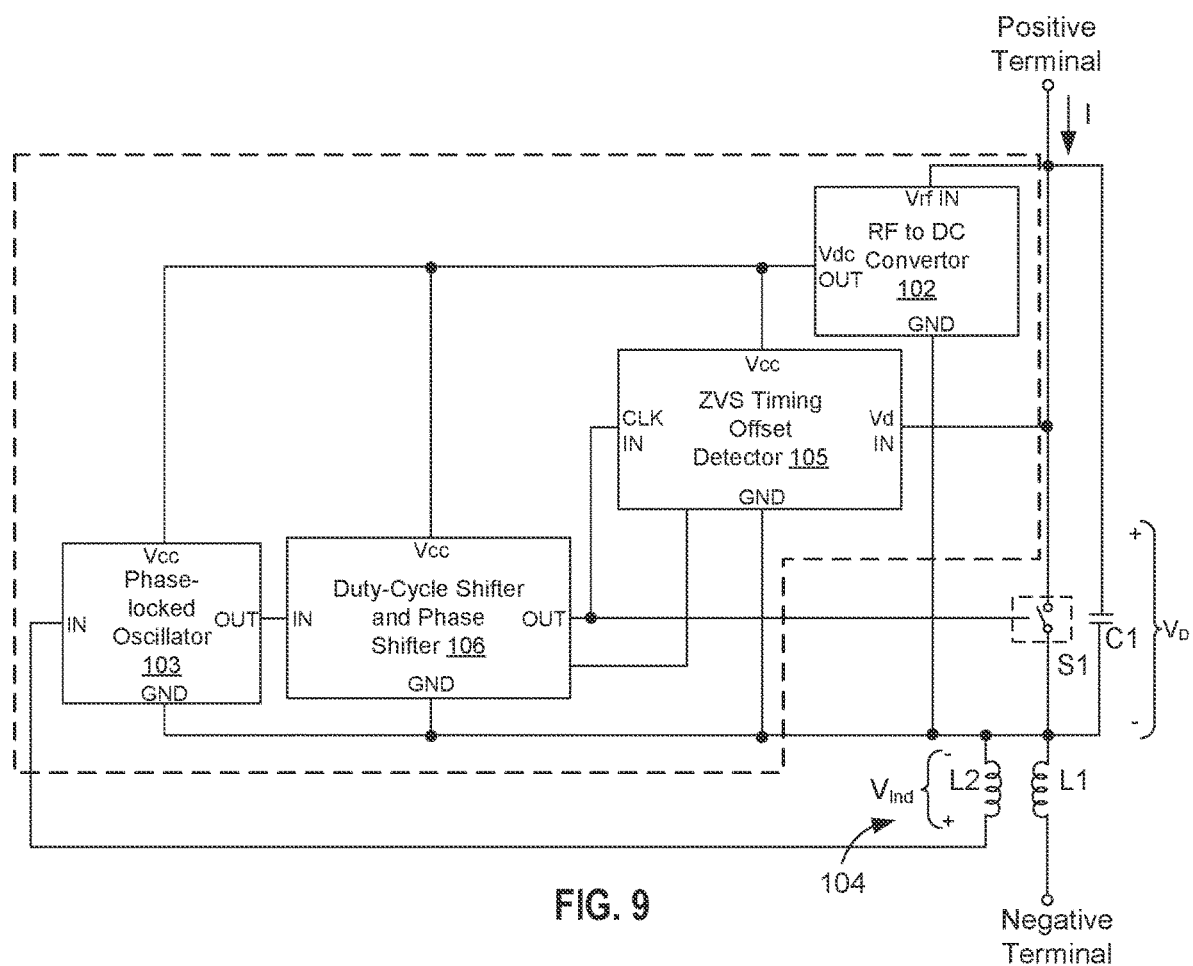
Figure 10:
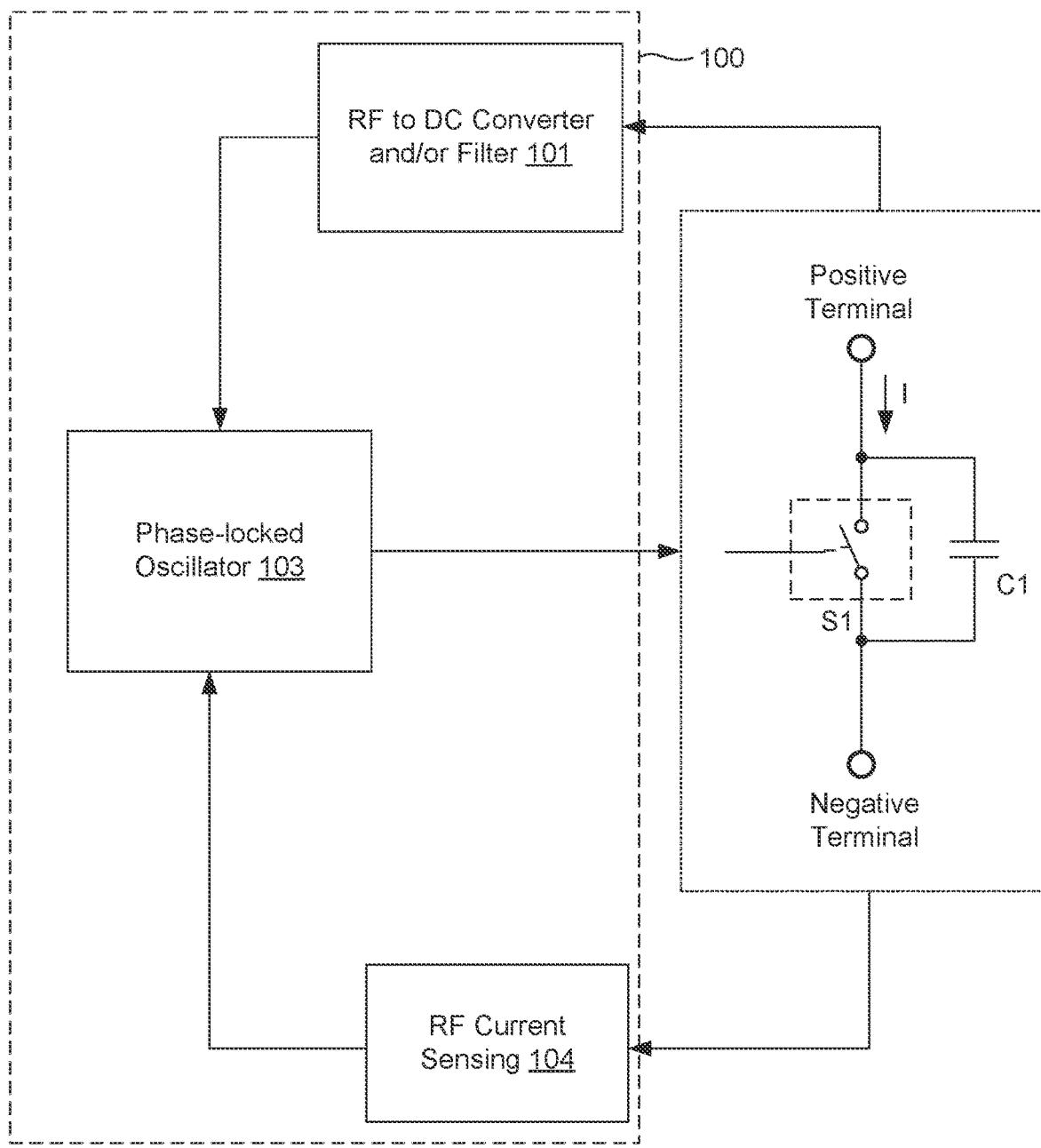

The control circuitries 80-100 may derive their DC power from the positive and negative terminals of the active component. It may use some combination of filtering, rectification, regulation, switching and/or DC-to-DC conversion to generate a constant DC voltage from the time-varying voltage, $V_D$, present across these two terminals. Alternatively, it may use some combination of filtering, rectification, regulation, switching and/or DC-to-DC conversion to generate a constant DC voltage from the RF voltage induced in the secondary inductor, $L_2$, in the transformer formed by the coupled inductors, $L_1$ and $L_2$ (FIG. 9). FIGS. 8 and 10 depict this sensing device more generally by its function as "RF current sensing."

In each of the embodiments shown in FIGS. 8-10, an RF-to-DC converter and/or filter block 101 (FIGS. 8 and 10), 102 (FIG. 9) of the control circuitries 80-100 provides power to an oscillator circuit which generates a square wave with period, T, duty cycle, $\delta$, and phase, $\varphi$. In the embodiment shown in FIG. 11, the RF Current Sensing device 104, Narrow Band-Pass Filter 112, and Impedance Matching 113 produce a drive signal which in some cases may be a sine wave with period T, with a DC offset provided by the DC Bias Generator 111. The amplitude and DC offset of this sine wave are chosen such that the electrically controlled switch, S1, is driven in its switching mode. The period, T, is set by an internal frequency reference within the control circuitry, such as a quartz crystal, in the phase-locked oscillator 103. The control circuitry 80-110 sets the phase of the control signal based on the phase of the voltage waveform output from the current sensing device 104. If the control circuitries implement AZVS (FIGS. 8 and 9), then if the voltage waveform, $V_D$, reaches zero before the instant in time when the switch, $S_1$, is turned on, this is detected by ZVS timing offset detector 105, the output of which is used by a duty-cycle shifter and phase shifter block 106 (FIGS. 8 and 9) to increase the duty cycle, $\delta$, causing the switch, $S_1$, to turn on sooner in the cycle. If the voltage waveform, $V_D$, does not yet reach zero at the instant in time when the switch, $S_1$, turns on, this is detected by ZVS timing offset detector 105, the output of which is used by the duty-cycle shifter and phase shifter block 106 to decrease the duty cycle, $\delta$, causing the switch, $S_1$, to turn on later in the cycle. The control circuitry continually monitors the voltage waveform, $V_D$, and adjusts the duty cycle, $\delta$, accordingly in order to maintain the ZVS condition. The timescale of this feedback mechanism is chosen to be much slower than the switching period, T.

The switch S1 of the active component can be an amplifier comprising a plurality of transistors, which are typically MOSFETs. The amplifier can include a Class E amplifier in some embodiments. While it is known to use ZVS configurations in Class E amplifiers, it is not known to use AZVS configurations in Class E amplifiers. By the AZVS mechanism described above, the active component is able to automatically maintain the ZVS condition over a wide range of tuning and load conditions of the Class-E amplifier. This allows efficient ZVS operation to be maintained without the need for precise tuning or impedance matching.

As depicted in FIG. 10, however, the control circuitry can perform its functions without implementing AZVS, but this may result in some energy being dissipated in the switch, S1, if the timing of switching is such that the switch is placed in the on state before $V_D$ has fully returned to zero volts. Thus, using the AZVS mechanism improves performance and efficiency.

Figure 11:
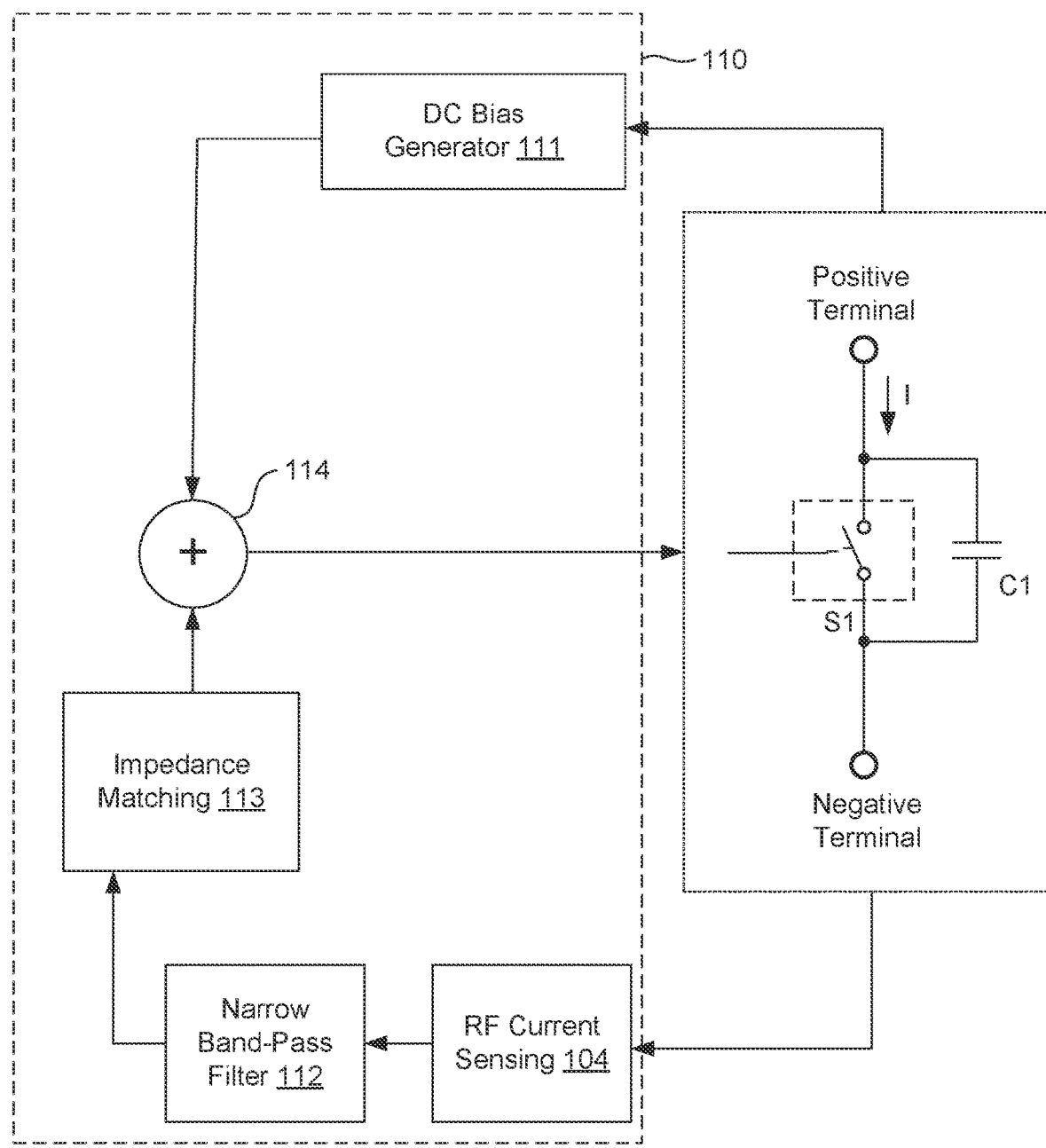

With reference to FIG. 11, the active component 110 uses a passive filter 112 instead of an active oscillator to drive the electrically-controllable switch S1. This filter 112 is a narrow band-pass filter that has a maximum RF transmission at the desired drive frequency of the system. The input voltage for the filter 112 comes from the RF current sensing device 104, which senses the RF current in the loop and outputs a voltage proportional to the RF current passing through the active component 110. As indicated above, examples of such components may be an RF transformer or a series resistor, which are passive components requiring no external power. The output of the filter 112 is impedance-matched to the input of the electrically-controllable switch S1 by an impedance matching circuit 113. The impedance matching is chosen such that the voltage and power drive requirements for the electrically-controllable switch S1 are satisfied for some pre-determined range of RF current levels.

The phase shift between the input and the output of the band pass filter 112 is chosen so that the drive signal at the input of the electrically-controllable switch S1 will have the proper timing to satisfy the ZVS requirement for a pre-determined tuning and loading of the loop. In addition to the signal generated by the RF current sensing device 104, the band-pass filter 112, and the impedance matching circuit 113, an additional DC bias voltage from the DC bias generator 111 is added to the voltage input to the electrically-controllable switch S1 through a voltage-summing mechanism 114. Examples of voltage summing mechanisms for adding DC and RF voltages include networks of resistors, capacitors, inductors, and/or transformers.

The DC bias generator 111 serves two purposes. First, it allows the system to begin oscillation upon start-up. When power is first applied, there is no RF current. Therefore, there is no RF input to the band-pass filter 112 and consequently no RF drive signal to the electrically-controllable switch S1. The DC bias generator 111 biases the electrically-controllable switch S1 to an intermediate state between fully on and fully off. When the electrically-controllable switch S1 is in this state, it can behave as a linear amplifier. Any fluctuation in the output of this linear amplifier causes a proportional fluctuation in the current in the loop. The RF current sensing device 104 picks up these fluctuations and sends them, through the band-pass filter 112, the impedance matching circuit 113, and summing network 114, to the input of the electrically-controllable switch S1. The system of the active component 110, therefore, forms a closed feedback loop. This feedback loop provides positive feedback, causing the system to oscillate at a frequency somewhere within the bandwidth of the narrow band-pass filter. Small initial fluctuations are amplified into a large oscillation. The oscillation grows exponentially until the electrically-controllable switch is saturated and is driven into its switching mode, at which point it becomes an efficient, Class-E amplifier.

The second purpose that the DC bias generator 111 serves is that it allows the duty cycle of the electrically-controllable switch S1 to be set to a pre-determined value, dependent upon the expected tuning, power, and load conditions of the loop. Note that this system naturally causes all of the active components to switch in phase. The phase of each drive signal is determined by the phase shift of its internal narrow band-pass filter 112 and the phase of the RF current circulating in the loop. The RF current is shared by all of the active components. Therefore, if the narrow band-pass filters 112 all have phase shifts which are approximately the same, the phase of the drive waveforms for all of the electrically-controllable switches S1 of the loop will be approximately the same, and the RF voltage waveforms of all of the active components will add constructively.

Figure 12:
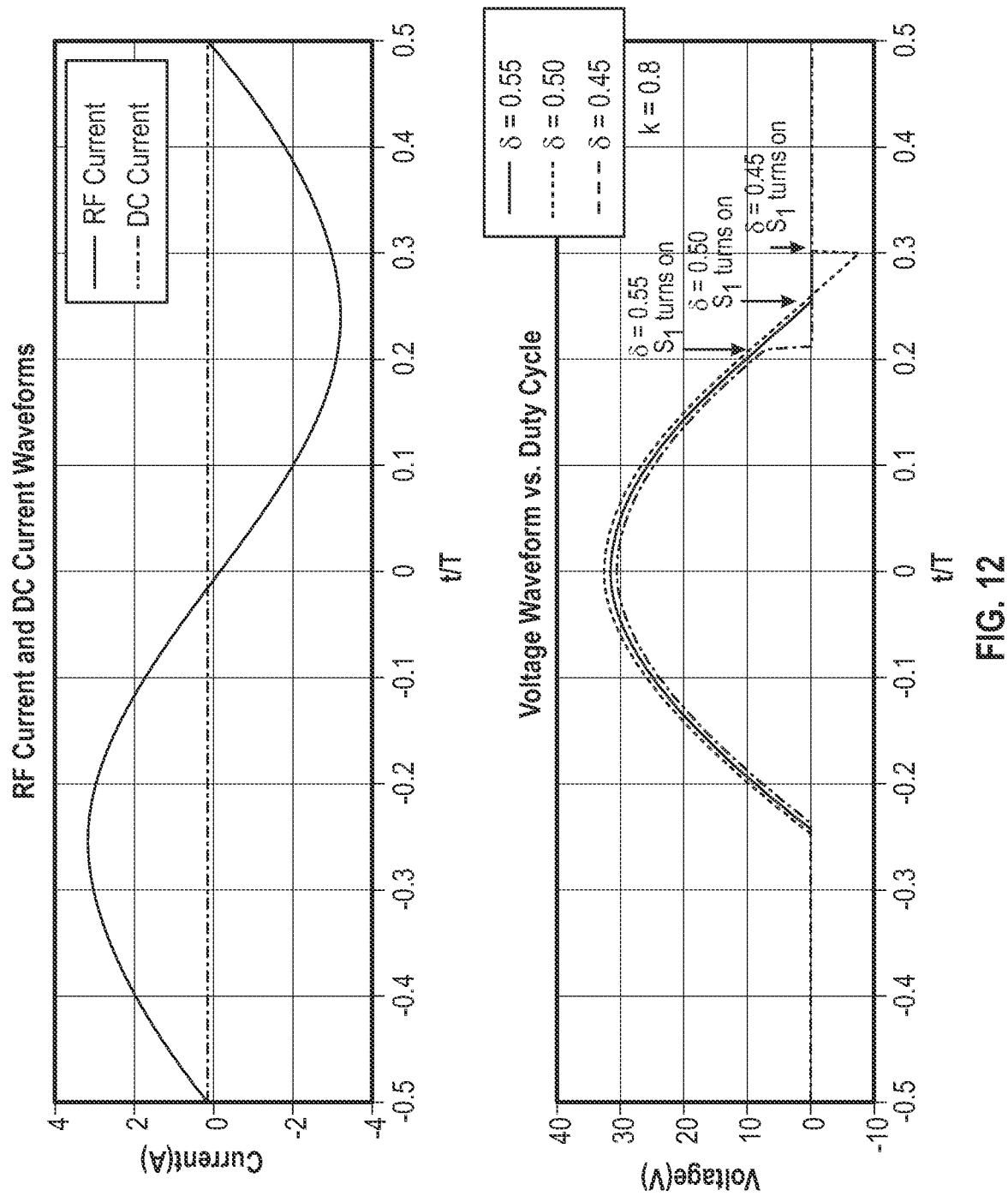
FIG. 12 is a graph which shows the relation between the voltage and current waveforms of the active component, and the relation between the voltage waveform and the duty cycle of the Control Signal.

FIG. 12 shows simulated voltage and current waveforms for a single active component. The upper plot shows the RF current (solid curve) and the DC current (dashed curve) flowing through the two terminals of the active component. The lower plot shows the voltage across the two terminals of the active component for three different values of the duty cycle, delta. In this example, the coefficient, k, is set to 0.8.

In this example, when the duty cycle of the Control Signal Output is 55% (dashed curve), the voltage has not yet reached zero at the point in time when the switch, S1, is turned on. It can be seen from the plot that the voltage suddenly drops to zero when the switch is turned on, implying that the electrical energy stored in capacitor, C1, is dissipated as heat.

When the duty cycle of the Control Signal Output is 50% (solid curve), the voltage is exactly zero at the point in time when the switch, S1, is turned on. Therefore, no heat is dissipated in the switch, S1, at the instant of switching, since the capacitor, C1, stores no energy at that instant of time.

When the duty cycle of the Control Signal Output is 45% (dotted curve), the voltage has already passed zero, and has become negative at the point in time when the switch, S1, is turned on. It can be seen from the plot that the voltage suddenly rises to zero when the switch is turned on, implying that the electrical energy stored in capacitor, C1, is dissipated as heat.

The ZVS Timing Offset Detector 105, shown in the block diagram depicted in FIGS. 8 and 9 detects the timing offset between the zero-crossing of the voltage waveform and the turn-on time of switch, S1. From this detected offset, it generates the feedback signal which adjusts the duty cycle and phase of the Control Signal Output in order to automatically maintain the ZVS condition.

Note that in some embodiments, the switch, S1, will be implemented using a MOSFET, which contains an internal body diode. The internal body diode will prevent the voltage across the two terminals of the active component from becoming any more negative than the forward voltage drop of this diode. Therefore, in some embodiments, the third waveform (dotted line) shown in FIG. 12 will be clipped at some negative voltage. This fact will not impact the ability of the ZVS Timing Offset Detector to detect the timing offset between the zero-crossing of the voltage waveform and the turn-on time of switch, S1.

Also note that the efficiency of the amplifier will be high so long as the ZVS condition is approximately satisfied, even if it is not exactly satisfied. The energy stored in the capacitor, C1, is quadratic with respect to its voltage. Therefore, the energy lost per cycle has a soft (i.e. quadratic) minimum at the optimal duty cycle for ZVS, meaning that small offsets in the duty cycle relative to the optimal duty cycle will not substantially degrade the efficiency of the system.

Because the AZVS system can tolerate small deviations from the optimal duty cycle without experiencing substantial degradation in its efficiency, it is possible to use a ZVS Timing Offset Detector which detects the time when the voltage waveform crosses a threshold voltage slightly above or below zero, rather than the time when the voltage waveform crosses zero. Such a detector may be more practical to implement, and would yield acceptable performance so long as the threshold voltage is small relative to the peak voltage. If necessary, a small time offset could be added to the ZVS Timing Offset Detector based on the slope of the voltage waveform and the value of the voltage threshold in order to correct for the small timing error introduced by the non-zero voltage threshold. Such an offset will make a ZVS Timing Offset Detector with a non-zero voltage threshold better approximate the behavior of an ideal detector with a voltage threshold of exactly zero.

The ZVS Timing Offset Detector may be implemented in several ways. Three possible implementations are described as follows. In one implementation, the ZVS Timing Offset Detector can be made to sense the time when the voltage across S1 passes a certain threshold which is greater than zero. Because this threshold-crossing will be delayed a short time after the rising edge of the Control Signal due to the turn-on time of switch, S1, the threshold crossing will occur after the rising edge of the Control Signal whenever the duty cycle is too long. Alternatively, when the duty cycle is too short, the voltage across S1 will already be below the threshold before the rising edge of the Control Signal. The ZVS Timing Offset Detector can therefore use the time order of the two events (i.e. rising edge of the Control Signal and threshold crossing of the voltage across S1) as a binary signal to determine whether the duty cycle should be either increased or decreased in order to achieve ZVS. In a second implementation, the ZVS Timing Offset Detector can be made to produce a binary signal, which has one logical value if the voltage across S1 is above a threshold at an instant of time equal to, or slightly before, the point in time when S1 turns on, and the opposite logical value if the voltage across S1 is below that threshold at the instant of time equal to, or slightly before, the point in time when S1 turns on.

This binary signal can be generated by making a comparison between the voltage across switch S1 and a threshold voltage, and storing that binary value in a digital latch, clocked by a signal synchronous with, or slightly preceding, the turn-on of S1. In some cases, a slight delay may be needed to satisfy the set-up and hold times of the latch. If that is the case, a slight delay may be added between the rising edge of the Control Signal and the turn-on of switch, S1, therefore ensuring that the logical comparison between the voltage across S1 and the threshold voltage can be properly measured before the voltage across S1 drops to zero. In a third implementation, if a linear feedback control signal is desired, the ZVS Timing Offset Detector can use a clocked sample-and-hold circuit to sample the value of the voltage across switch S1 at the instant when S1 turns on. A slight delay may be added between the rising edge of the Control Signal and the turn-on of S1 if necessary to satisfy the set-up and hold times of the sample-and-hold circuit.

Figure 14:
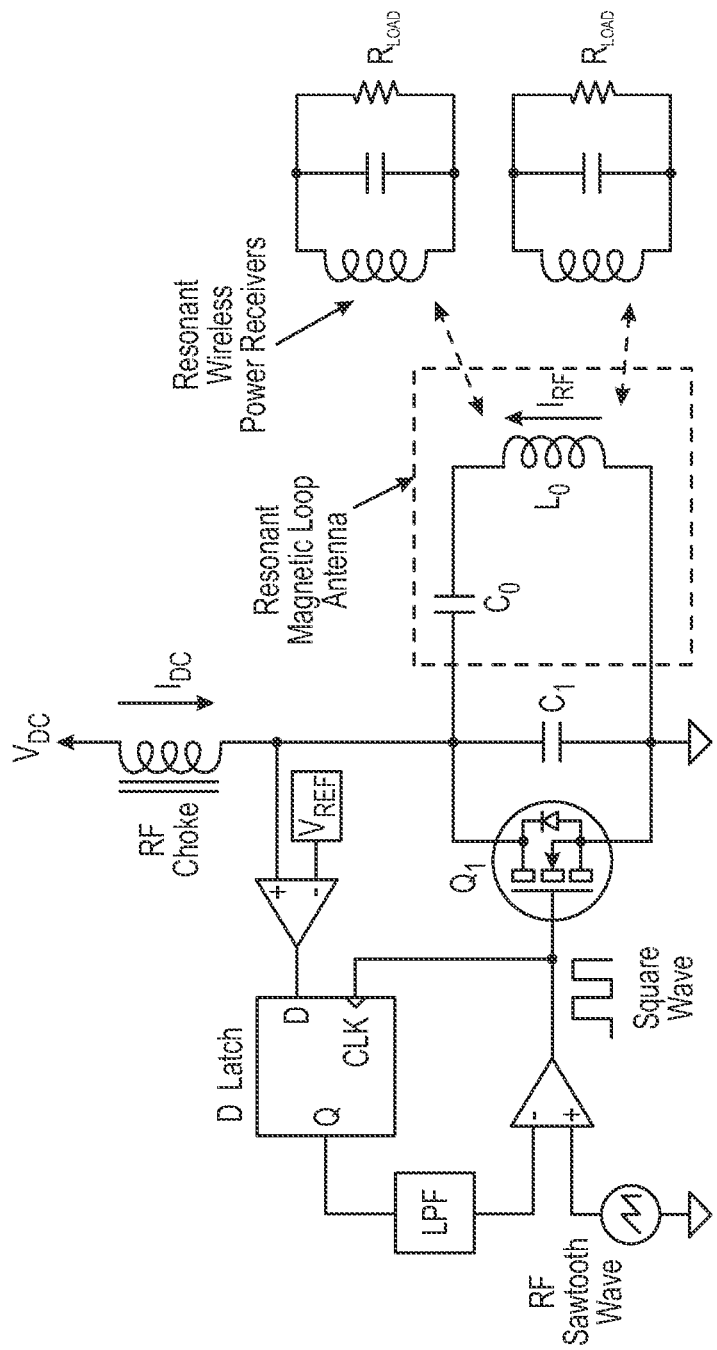

Another embodiment for automatic zero-voltage switching (AZVS) is shown in FIG. 14. A comparator and latch can detect whether the drain voltage of Q1 is above or below a reference voltage, VREF, at the instant when Q1 turns on. The output of the latch is low-pass-filtered and used as a feedback signal to control the duty cycle of the gate drive waveform. The feedback shifts the time at which Q1 turns on until the drain voltage of Q1 is equal to VREF at the rising edge of the gate drive signal. If VREF is very close to zero, then this feedback loop automatically maintains the amplifier in a state of ZVS operation. As such, the reference voltage, VREF, can set to be as close to 0V as possible, while still being larger than the amplitude of any drain voltage ringing caused by parasitic inductance. The feedback network varies the duty cycle of the gate drive to ensure that ZVS conditions are always met.

The AZVS amplifier described herein provides efficient operation to be maintained under varying load conditions, and in the presence of detuning due to variations in a variable shape of the loop. However, another problem arises for loops of varying size. As the size of the loop grows, its inductance increases. The total series capacitance, C0, must therefore decrease. If the capacitor, C1, remains fixed, then K must decrease. Eventually, the AZVS amplifier will no longer be capable of accommodating a desired tuning range, $\Delta f_0$. It is possible to reduce C1 with increasing loop size, but that is undesirable two reasons. First, in order for the RF current amplitude to be held constant, the DC supply voltage would need to vary inversely with C1, requiring the use of components with a very high voltage rating as the loop size becomes large. Second, if the loop is driven from one point, the RF input impedance at the drive point grows continually larger as the size of the loop grows.

A high impedance at the drive point means that a high RF voltage and high electric field will be present at that point and in its vicinity. This electric field has the potential not only to cause losses in nearby dielectrics, but also safety concerns due to the possible absorption of RF power in human tissue via stray electric fields. Both of these problems are solved by driving the loop from multiple points with multiple, synchronized RF generators. Each RF generator requires a source of DC power. While it is possible to run a separate power cable to each generator, this would vastly increase the amount of wiring. It is therefore desirable to power the generators without any additional wiring other than the wire of the loop itself. This is achieved by adding RF chokes in parallel with the distributed capacitors of the loop, which allow the loop to support both a DC and an RF current simultaneously. Each RF generator takes in DC power and outputs RF power through the same two terminals.

Figure 15:
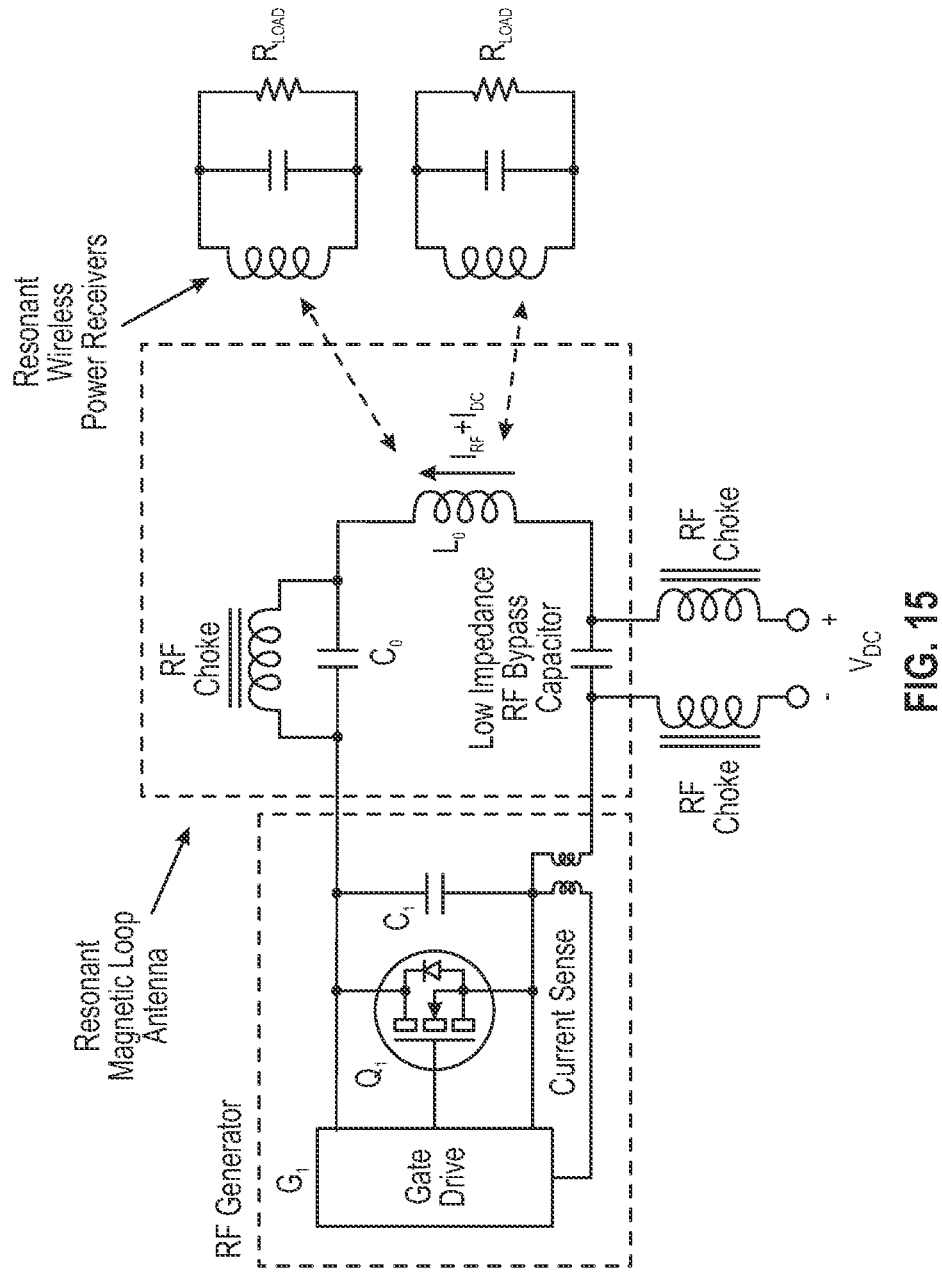
FIG. 15 is a Class-E amplifier rearranged such that a RF generator draws DC power from the same two terminals it uses to output RF power in accordance with various embodiments of the present disclosure.

FIG. 15 shows a Class-E amplifier modified in order to accomplish the foregoing. Specifically, FIG. 15 shows a Class-E amplifier, rearranged so that the RF generator draws its DC power from the same two terminals it uses to output RF power. The gate drive circuit, $G_1$, uses a drain-to-source voltage of $Q_1$ as a source of power in addition to using it as an input signal to the AZVS feedback loop. $G_1$ also contains an additional input connected to a current-sensing transformer, which is used to lock the phase of an internal oscillator to the phase of the RF current circulating around the loop. This phase-locking is necessary to lock the phases of multiple RF generators when they are connected together in series.

Figure 16:
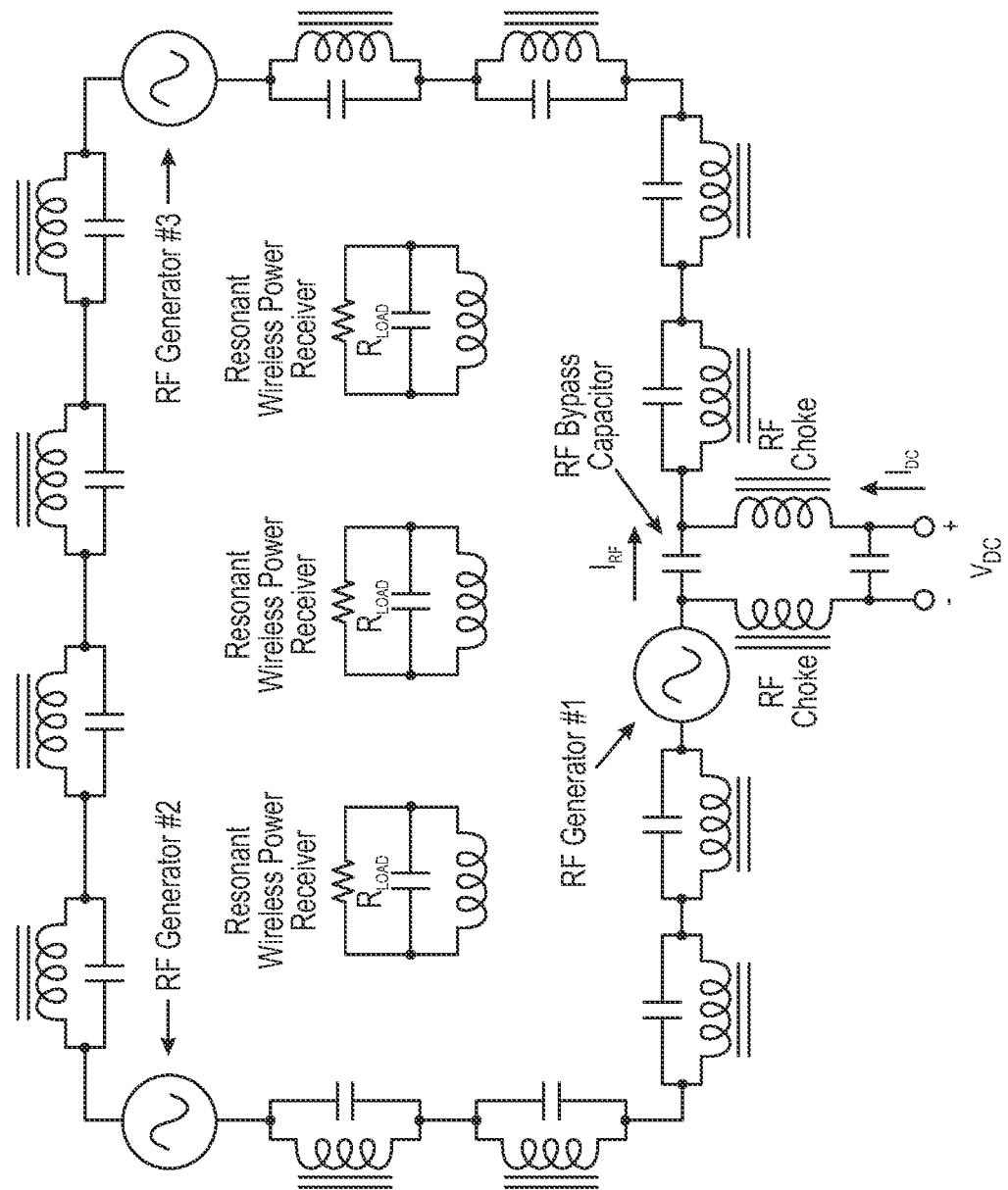
FIG. 16 is a simplified circuit schematic of a resonant magnetic loop antenna driven by distributed RF generators in accordance with various embodiments of the present disclosure.

FIG. 16 shows how multiple RF generators, like the one in FIG. 15, may be connected in series and distributed around the loop. More specifically, FIG. 16 shows a simplified schematic of a resonant magnetic loop antenna driven by distributed RF generators. In general, the loop consists of $N_a$ active RF generators, and $N_p$ passive joints, connected by lengths of wire. Each passive joint consists of a capacitor in parallel with an RF choke. The RF chokes are chosen to have a high impedance at the drive frequency so as to not significantly affect the resonance of the loop, but still allow DC current to flow around the loop. The RF generators use the same two terminals as both a DC power input and an RF power output.

For the distributed version of the Class-E amplifier, the value of the constant, K, is given by:

$$K = \frac{\chi_1}{\chi_1 + \chi_0} = \frac{1}{1 + \frac{\chi_0}{\chi_1}} = \frac{1}{1 + \frac{N_p \chi_0^{(sing.)}}{N_a \chi_1^{(sing.)}}}, \quad \text{(eq. 2)}$$

where $\chi_0$ is the total series reactance of all of the passive joints, $\chi_1$ is the total series reactance of all of the capacitors of the active joints, $\chi_0^{(sing.)}$ is the reactance of a single passive joint, and $\chi_1^{(sing.)}$ is the reactance of the capacitor of a single active joint. If the ratio, $N_p \chi_0^{(sing.)}/N_a \chi_1^{(sing.)}$, is held fixed, then eq. 2 implies that K is independent of the size of the loop. Therefore, unlike the case of a loop containing a single RF generator and single drive point, the distributed RF generator can accommodate a tuning range which is independent of the size of the loop without any changes to component values.

Phase-Locking. In order to properly drive the loop, all of the distributed RF generators depicted in FIG. 16 must be synchronized. While this may be achieved by connecting all of the amplifiers to a common local oscillator via a star configuration, this solution is undesirable, since it would require a separate cable for each RF generator, vastly increasing the amount of wiring. It is therefore desirable to arrange the RF generators so that they lock in phase with each other without any additional wiring other than the wire of the loop itself. According to various embodiments, phase-locking may be achieved by locking each RF generator to the phase of some RF signal which they all share in common. Because all of the RF generators are connected in series, the common RF current shared by all of the RF generators suggests itself as a natural choice for this common signal.

FIG. 15 shows how phase-locking can be accomplished. A current-sensing transformer picks up an induced voltage proportional to the RF current flowing around the loop. The phase of an internal oscillator circuit is then locked to the phase of this induced voltage. The phase-locked oscillator is used to generate the gate-drive waveform. Assuming that all of the RF generators are identical, this guarantees that the gate-drive waveform of each RF generator has the same phase relative to the phase of the RF current, which ensures that all of the RF generators are in phase with respect to each other.

Figure 17:
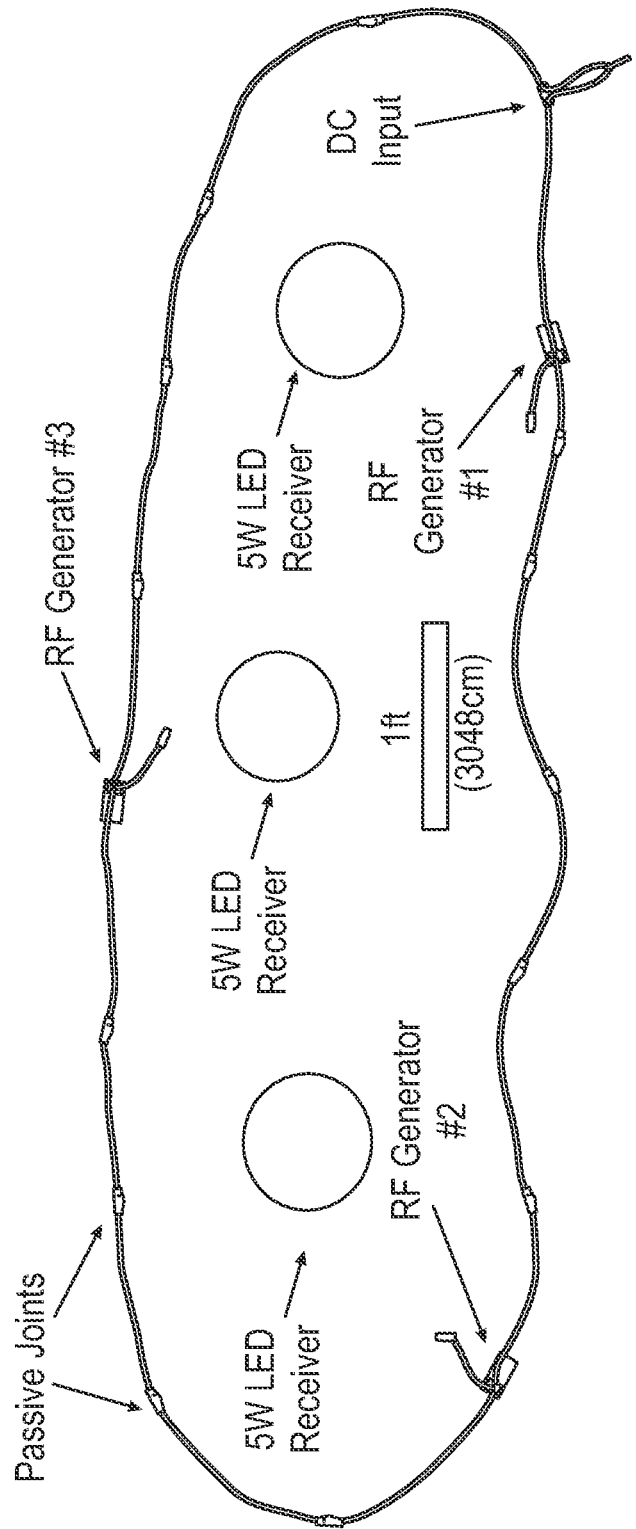
FIG. 17 is a photograph showing a physical embodiment of a wireless power system in accordance with various embodiments of the present disclosure.

FIG. 17 is a photograph showing a physical embodiment of the schematic of FIG. 15. Specifically, FIG. 17 shows a photograph of a wireless power system having a distributed RF generator (e.g., three RF generators) powering and coupled to three regulated wireless loads (or wireless receivers). Each receiver delivers a regulated 5 W of power to an LED load. The DC input power was 34 W (0.6 A at 57V). The DC-to-DC efficiency was 44% when the loads were present. The system drew 13 W of DC power when the loads were absent.

It should be noted that representative or illustrative embodiments have been described herein for the purpose of demonstrating the inventive principles and concepts. As will be understood by persons of skill in the art in view of the description provided herein, many modifications may be made to the embodiments described herein without deviating from the scope of the invention. For example, while the inventive principles and concepts have been described primarily with reference to particular configurations of active components with particular configurations of amplifiers, the inventive principles and concepts are equally applicable to other configurations that accomplish the goals described herein, as will be understood by those of skill in the art in view of the description provided herein. For example, other classes of amplifiers and/or amplifiers that do not incorporate ZVS principles may be used to achieve the distributed RF generator configuration shown in FIG. 1. Many other modifications may be made to the embodiments described herein without deviating from the inventive principles and concepts, and all such modifications are within the scope of the invention, as will be understood by those of skill in the art.

Clause 1. A distributed radio frequency (RF) generator for wireless power transfer, comprising: an electrically-conductive loop having at least a first end and a second end that are adapted to be electrically coupled to a direct current (DC) power source, wherein the loop comprises a plurality of segments, each of the plurality of segments comprising: a length of wire and at least one active component, wherein the at least one active component has a first terminal and a second terminal that are electrically coupled to the loop, wherein: a DC voltage exists between the first terminal and the second terminal; a DC current flows into the first terminal and out of the second terminal; an oscillating RF voltage is output across the first terminal and the second terminal; and the at least one active component is synchronized in phase.

Clause 2. The distributed RF generator of clause 1, wherein the distributed RF generator further comprises: at least one passive sub-segment comprising a length of wire and at least one passive component, the at least one passive component comprising at least one capacitor; and at least one active sub-segment, the at least one active sub-segment comprising a length of wire and the at least one active component.

Clause 3. The distributed RF generator of clauses 1-2, wherein the at least one passive component comprises the at least one capacitor and at least one RF choke connected in parallel with the at least one capacitor.

Clause 4. The distributed RF generator of clauses 1-3, wherein the at least one capacitor is preselected such that the loop is series resonant at a pre-determined frequency.

Clause 5. The distributed RF generator of clauses 1-4, wherein: the at least one RF choke includes an inductor; and the at least one RF choke is preselected to have a high impedance at the pre-determined frequency so as not to significantly affect the resonance of the loop.

Clause 6. The distributed RF generator of clauses 1-5, wherein each active component has a zero voltage switching (ZVS) configuration.

Clause 7. The distributed RF generator of clauses 1-6, wherein: each ZVS configuration comprises control circuitry that automatically performs ZVS based on a sensed condition within the respective active component; and the sensed condition within the respective active component comprises a sensed RF current.

Clause 8. The distributed RF generator of clauses 1-7, wherein: a phase synchronization of the at least one active component is performed automatically in that all of the active component are phase synchronized to the same RF current flowing in the loop; and each ZVS configuration comprises a plurality of transistors configured as an electrically-controllable switch that operates as ZVS amplifier.

Clause 9. The distributed RF generator of clauses 1-8, wherein each ZVS amplifier is a Class E amplifier.

Clause 10. The distributed RF generator of clauses 1-9, wherein: the DC power source is one of a plurality of direct current (DC) power sources; and the first end and the second end of the electrically-conductive loop are adapted to be electrically coupled to the plurality of DC power sources.

Clause 11. A system for wireless power transfer, comprising: a direct current (DC) power source; and a distributed radio frequency (RF) generator for wireless power transfer, comprising: an electrically-conductive loop having at least a first end and a second end that are adapted to be electrically coupled to the DC power source, wherein the loop comprises a plurality of segments, each of the plurality of segments comprising: a length of wire and at least one active component, wherein the at least one active component has a first terminal and a second terminal that are electrically coupled to the loop, wherein: a DC voltage exists between the first terminal and the second terminal; a DC current flows into the first terminal and out of the second terminal; an oscillating RF voltage is output across the first terminal and the second terminal; and the at least one active component is synchronized in phase.

Clause 12. The system of clause 11, wherein: the DC power source is one of a plurality of direct current (DC) power sources; and the first end and the second end of the electrically-conductive loop are adapted to be electrically coupled to the plurality of DC power sources. The system can further include the components of the distributed RF generator of clauses 1-10.

Clause 13. A method for wireless power transfer, comprising: providing a direct current (DC) power source; and providing a distributed radiofrequency (RF) generator comprising an electrically-conductive loop having at least first and second ends that are electrically coupled to the DC power source, wherein the loop comprises a plurality of segments, each of the plurality of segments comprising: a length of wire and at least one active component, wherein the at least one active component has a first terminal and a second terminal that are electrically coupled to the loop, wherein: a DC voltage exists between the first terminal and the second terminal; a DC current flows into the first terminal and out of the second terminal; an oscillating RF voltage is output across the first terminal and the second terminal; and the at least one active component is synchronized in phase.

Clause 14. The method of clause 13, wherein the distributed RF generator further comprises: at least one passive sub-segment comprising a length of wire and at least one passive component, the at least one passive component comprising at least one capacitor; and at least one active sub-segment, the at least one active sub-segment comprising a length of wire and the at least one active component.

Clause 15. The method of clauses 13-14, wherein: the DC power source is one of a plurality of direct current (DC) power sources; and the first end and the second end of the electrically-conductive loop are adapted to be electrically coupled to the plurality of DC power sources. The method can further include providing the components of the distributed RF generator of clauses 1-10 or the system of clauses 11-12.

The invention claimed is:

1. A distributed radio frequency (RF) generator for wireless power transfer, comprising:
an electrically-conductive loop having at least a first end and a second end that are adapted to be electrically coupled to a direct current (DC) power source, wherein the loop comprises a plurality of segments, each of the plurality of segments comprising:
a length of wire and at least one active component, wherein the at least one active component has a first terminal and a second terminal that are electrically coupled to the loop, wherein:
a DC voltage exists between the first terminal and the second terminal;
a DC current flows into the first terminal and out of the second terminal;
an oscillating RF voltage is output across the first terminal and the second terminal; and
the at least one active component is synchronized in phase.

2. The distributed RF generator of claim 1, wherein the distributed RF generator further comprises:
at least one passive sub-segment comprising a length of wire and at least one passive component, the at least one passive component comprising at least one capacitor; and
at least one active sub-segment, the at least one active sub-segment comprising a length of wire and the at least one active component.

3. The distributed RF generator of claim 2, wherein the at least one passive component comprises the at least one capacitor and at least one RF choke connected in parallel with the at least one capacitor.

4. The distributed RF generator of claim 3, wherein the at least one capacitor is preselected such that the loop is series resonant at a pre-determined frequency.

5. The distributed RF generator of claim 4, wherein:
the at least one RF choke includes an inductor; and
the at least one RF choke is preselected to have a high impedance at the pre-determined frequency so as not to significantly affect the resonance of the loop.

6. The distributed RF generator of claim 1, wherein each active component has a zero voltage switching (ZVS) configuration.

7. The distributed RF generator of claim 6, wherein:
each ZVS configuration comprises control circuitry that automatically performs ZVS based on a sensed condition within the respective active component; and
the sensed condition within the respective active component comprises a sensed RF current.

8. The distributed RF generator of claim 7, wherein:
a phase synchronization of the at least one active component is performed automatically in that all of the active component are phase synchronized to the same RF current flowing in the loop; and
each ZVS configuration comprises a plurality of transistors configured as an electrically-controllable switch that operates as ZVS amplifier.

9. The distributed RF generator of claim 8, wherein each ZVS amplifier is a Class E amplifier.

10. The distributed RF generator of claim 1, wherein:
the DC power source is one of a plurality of direct current (DC) power sources; and
the first end and the second end of the electrically-conductive loop are adapted to be electrically coupled to the plurality of DC power sources.

11. A system for wireless power transfer, comprising:
a direct current (DC) power source; and
a distributed radio frequency (RF) generator for wireless power transfer, comprising:
an electrically-conductive loop having at least a first end and a second end that are adapted to be electrically coupled to the DC power source, wherein the loop comprises a plurality of segments, each of the plurality of segments comprising:
a length of wire and at least one active component, wherein the at least one active component has a first terminal and a second terminal that are electrically coupled to the loop, wherein:
a DC voltage exists between the first terminal and the second terminal;
a DC current flows into the first terminal and out of the second terminal;
an oscillating RF voltage is output across the first terminal and the second terminal; and
the at least one active component is synchronized in phase.

12. The system of claim 11, wherein:
the DC power source is one of a plurality of direct current (DC) power sources; and
the first end and the second end of the electrically-conductive loop are adapted to be electrically coupled to the plurality of DC power sources.

13. A method for wireless power transfer, comprising:
providing a direct current (DC) power source; and
providing a distributed radiofrequency (RF) generator comprising an electrically-conductive loop having at least first and second ends that are electrically coupled to the DC power source, wherein the loop comprises a plurality of segments, each of the plurality of segments comprising:
   a length of wire and at least one active component, wherein the at least one active component has a first terminal and a second terminal that are electrically coupled to the loop, wherein:
      a DC voltage exists between the first terminal and the second terminal;
      a DC current flows into the first terminal and out of the second terminal;
      an oscillating RF voltage is output across the first terminal and the second terminal; and
      the at least one active component is synchronized in phase.

14. The method of claim 13, wherein the distributed RF generator further comprises:
at least one passive sub-segment comprising a length of wire and at least one passive component, the at least one passive component comprising at least one capacitor; and
at least one active sub-segment, the at least one active sub-segment comprising a length of wire and the at least one active component.

15. The method of claim 13, wherein:
the DC power source is one of a plurality of direct current (DC) power sources; and
the first end and the second end of the electrically-conductive loop are adapted to be electrically coupled to the plurality of DC power sources.

16. The method of claim 14, wherein the at least one passive component comprises the at least one capacitor and at least one RF choke connected in parallel with the at least one capacitor, wherein the at least one capacitor is preselected such that the loop is series resonant at a pre-determined frequency.

17. The method of claim 16, wherein:
the at least one RF choke includes an inductor; and
the at least one RF choke is preselected to have a high impedance at the pre-determined frequency so as not to significantly affect the resonance of the loop.

18. The method of claim 13, wherein each active component has a zero voltage switching (ZVS) configuration.

19. The method of claim 18, wherein:
a phase synchronization of the at least one active component is performed automatically in that all of the active component are phase synchronized to the same RF current flowing in the loop;
each ZVS configuration comprises a plurality of transistors configured as an electrically-controllable switch that operates as ZVS amplifier; and
each ZVS amplifier is a Class E amplifier.

20. The system of claim 11, wherein the distributed RF generator further comprises:
at least one passive sub-segment comprising a length of wire and at least one passive component, the at least one passive component comprising at least one capacitor; and
at least one active sub-segment, the at least one active sub-segment comprising a length of wire and the at least one active component.

* * * * *